United States Patent [19]

Dorey et al.

[11] 4,150,438

[45] Apr. 17, 1979

[54] INTERFACES FOR CONNECTING CODED AND NON-CODED DATA TRANSMISSION SYSTEMS

[75] Inventors: Howard A. Dorey, Godalming; Michael I. Spooner, Aldershot; Robert J. Cooke, Farnham, all of England

[73] Assignee: The Solartron Electronic Group Ltd., Farnborough, England

[21] Appl. No.: 815,133

[22] Filed: Jul. 13, 1977

[30] Foreign Application Priority Data

Jul. 14, 1976 [GB] United Kingdom ............... 29375/76

[51] Int. Cl.² ............................................. G06F 3/04
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 3,348,209 | 10/1967 | Brooks | 364/900 |
| 3,976,979 | 8/1976 | Parkinson et al. | 364/200 |
| 4,007,449 | 2/1977 | Vercesi | 364/200 |
| 4,016,548 | 4/1977 | Law et al. | 364/200 |
| 4,038,642 | 7/1977 | Bouknecht et al. | 364/200 |
| 4,047,162 | 9/1977 | Dorey et al. | 364/900 |
| 4,048,673 | 9/1977 | Hendrie et al. | 364/200 |
| 4,054,947 | 10/1977 | Shanks et al. | 364/900 |
| 4,065,662 | 12/1977 | Garczynski et al. | 364/900 |

Primary Examiner—Melvin B. Chapnick
Attorney, Agent, or Firm—W. R. Sherman; Edward Manzo; Martin Novack

[57] ABSTRACT

An interface circuit for use in a data transmission system has a first port for connection to a 16 wire data highway of the type proposed by the I.E.C. (International Electrochemical Commission) for the interconnection of instruments, and a second port capable of being connected to an eight-wire or two-wire data link. The interface circuit includes an encoding circuit operative to encode at least some commands applied to the first port, and an enabling circuit for selectively enabling data applied to the data terminals of the first port and the encoded commands to pass to the second port. The interface circuit also includes status circuits for establishing statuses of the circuit in accordance with commands supplied thereto, including a status indicating that the interface has been addressed, and a circuit responsive to the absence of this "addressed" status to disable the enabling circuit, so as to prevent at least some of the encoded commands and the data received at the data terminals of the first port from being passed to the second port.

8 Claims, 25 Drawing Figures

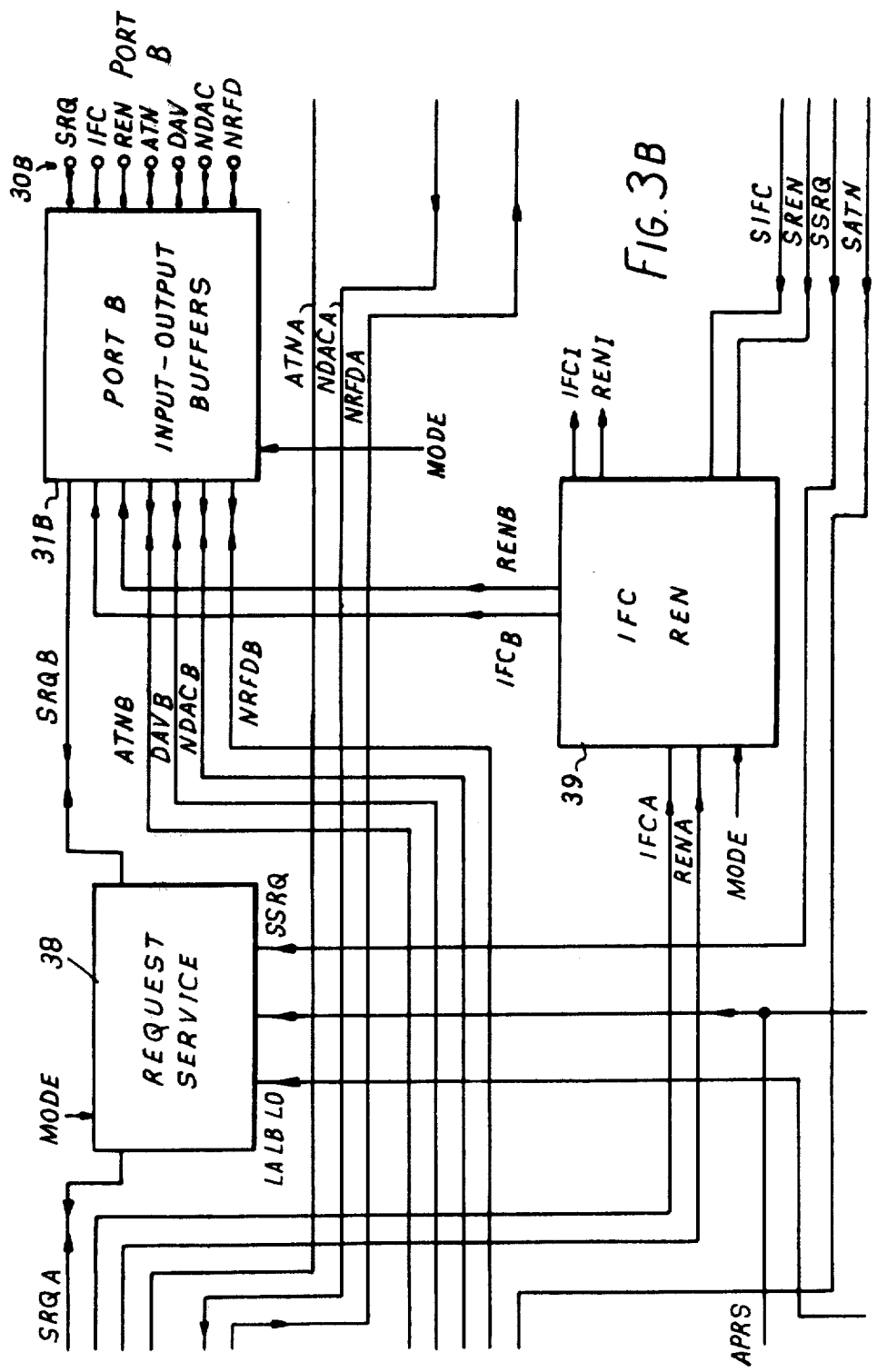

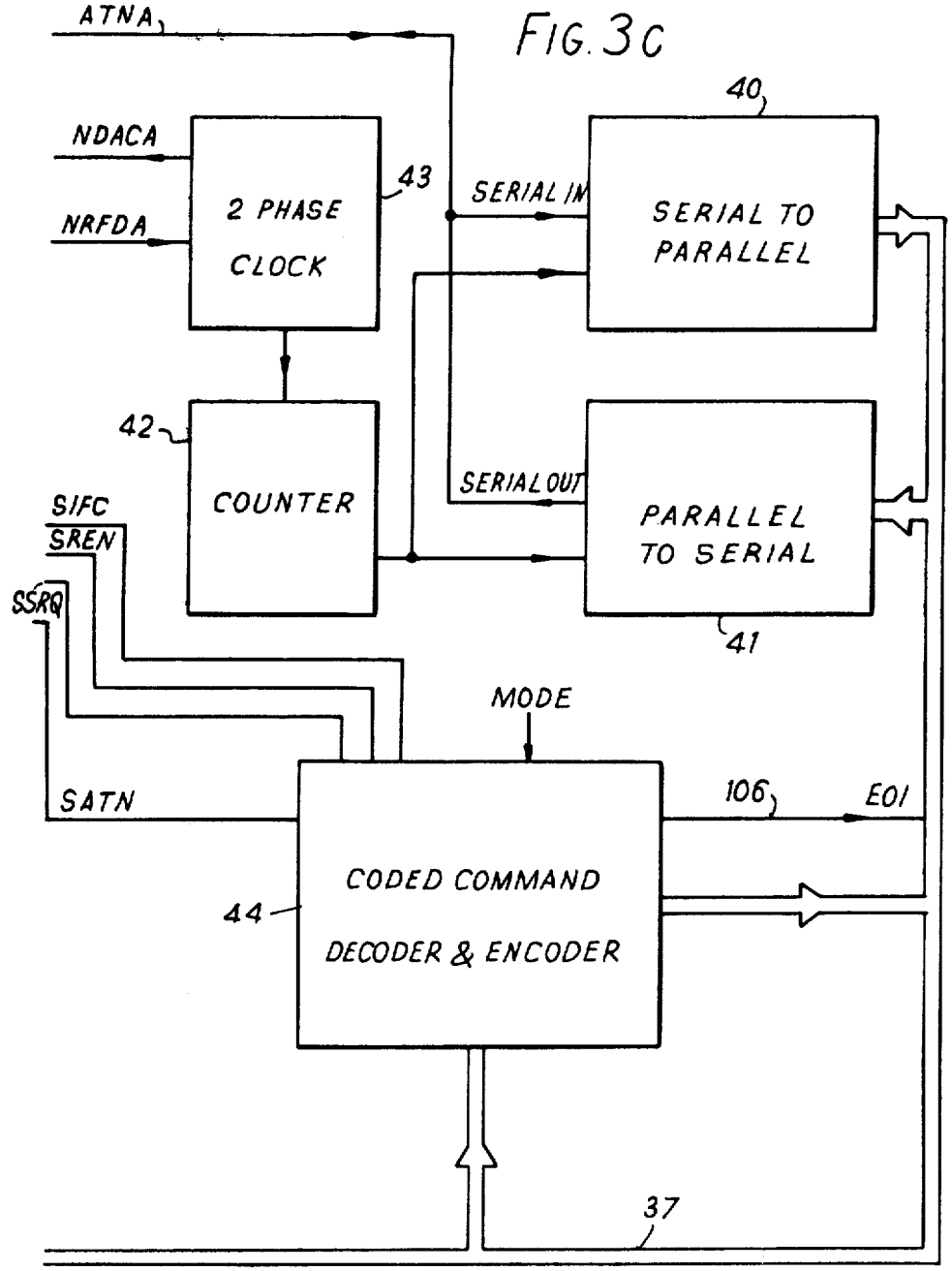

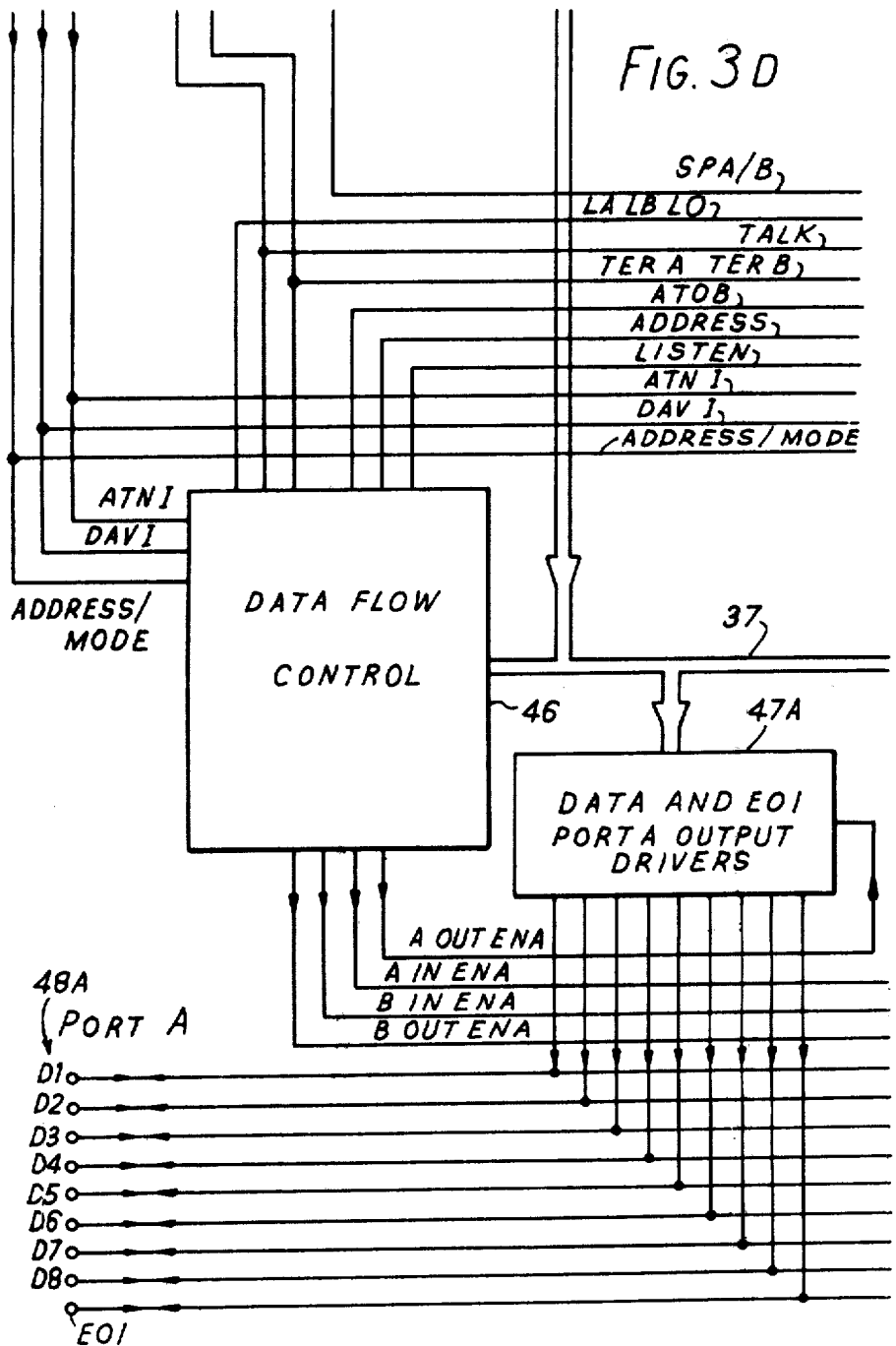

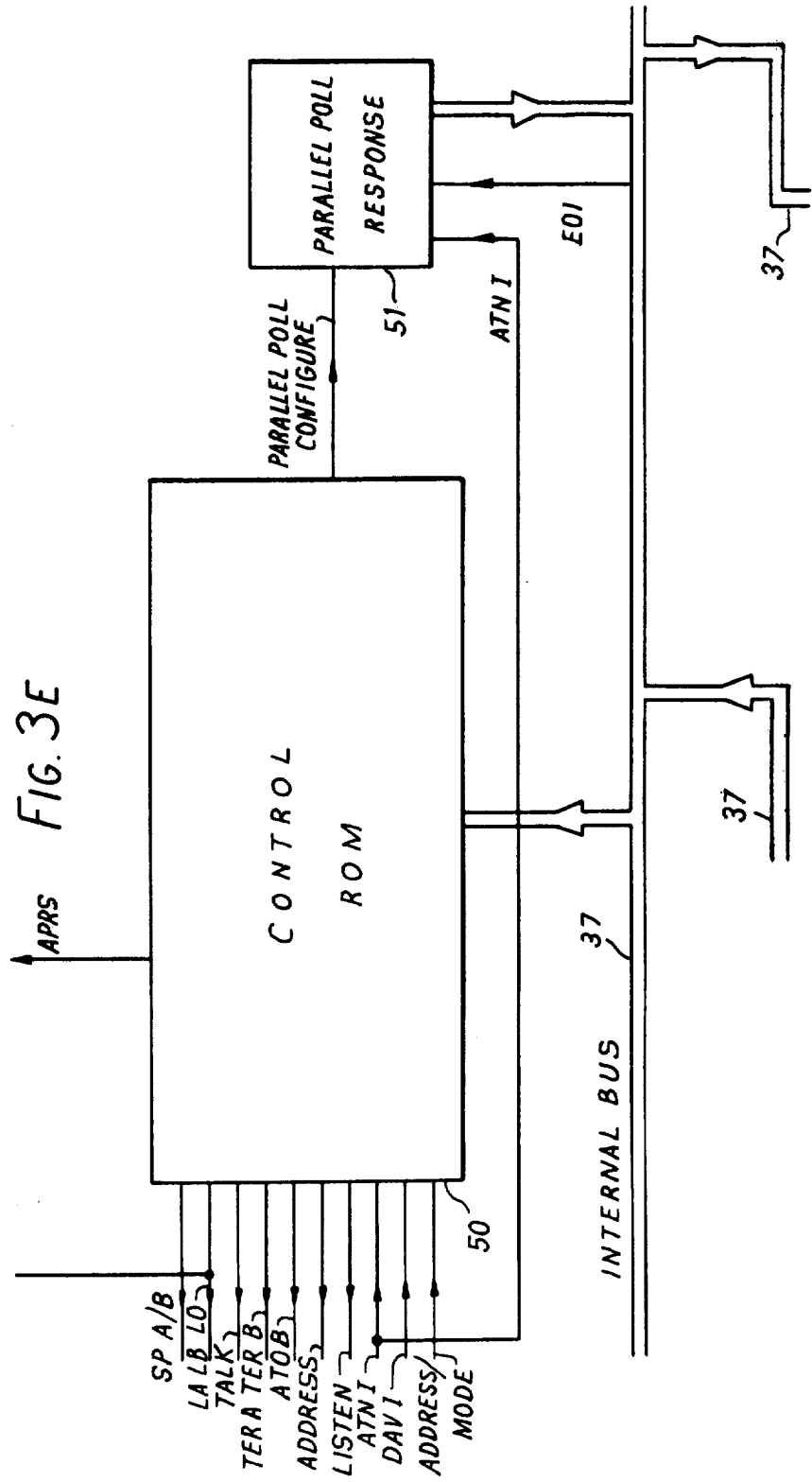

INTERFACES FOR CONNECTING CODED AND NON-CODED DATA TRANSMISSION SYSTEMS

BACKGROUND OF THE INVENTION

The present invention relates to interfaces for data transmission systems, an interface beging a circuit which connects a data link to a device or to another data link and which has two ports, each including a plurality of terminals, for connection to corresponding terminals of the data link on the one hand and to the device or other data link on the other hand. The invention is concerned with interfaces for use in systems wherein at least one data link is a highway, that is to say, a shared data link to which more than two interfaces are connected, communication being controlled by addressing procedures directed to the interfaces by a controller.

Devices include data acceptors which are primarily addressed as listeners although they may be addressed as talkers in poll and other command operations; data sources which are primarily addressed as talkers but are also addressable as listeners during command operations; devices which are both sources and acceptors; and controllers which act as talkers and listeners in establishing the operational status of the overall system. A controller is generally also a data source and a data acceptor, and may be what is generally referred to as a data processor or digital computer.

Proposals have long been considered internationally under the aegis of the International Electrotechnical Commission (IEC) for a standard relating to the situation in which the system has a single highway, of a type which will be called an IEC bus, to which a plurality (up to 15) devices are connected via respective interfaces. The current IEC standard interface proposal is set out in a document designated IEC TC66 (Central Office) 22, reference (1). An IEC bus is a bit-parallel, byte-serial highway which has in addition to data lines for the bit-parallel data, a plurality of handshake lines for synchronizing the exchange of bytes of data and a plurality of control or management lines which are lines dedicated to certain control functions. The control functions at present envisaged are:

IFC, "interface clear" which places all interfaces in a known waiting state.

REN, "remote enable" which sets a device to remote control.

ATN, "attention" whose presence with a data byte changes the meaning of the byte to an address or command function.

EOI, "end or identify" which indicates the end of a message or, in conjunction with ATN, is used in polling.

SRQ, "service request" which is sent back to the controller to indicate that a device needs attention.

Three handshake lines are envisaged, but little attention will be given to these. Their nature is described in detail both in the U.S. National Standard ANSI MC 1-1-1975, (reference 2) and in the aforementioned reference (1). Alternatively, the handshake signals may take the form disclosed in our British Patent Specification No. 1,463,626, (U.S. Pat. No. 3,982,061) reference (3).

A simple IEC system can cater satisfactorily for the requirements of say, a laboratory where all devices are geographically close but is severely limited in wider applications by two factors. Firstly, the limitation to 15 devices is insufficient to deal with complex control situations, e.g., in a chemical plant and, secondly, the length of an IEC bus is limited to 20 meters in order to avoid problems arising from skew between bits in the different lines and signal degradation. We have already proposed a solution to the first problem in our British Patent Specification No. 1,467,726, (U.S. Pat. No. 4,047,162) reference (4), which discloses an interface which can not only be used between a highway and a device but which can also be used between two highways. This makes it possible to build up complex systems involving two or more highways catering for as many devices as is required.

However, the problem remains of linking widely scattered devices; in a chemical plant, distances between will typically be hundreds of meters rather than 20 meters. Consideration has, therefore, been given to the use of serial data links between different parts of a system, i.e., links which carry data in bit-serial form, either synchronously or asynchronously but without the use of handshake lines. Although it is envisaged that such links will include also an SRQ line (to enable a listener to request service against the direction of data flow) it has been considered inappropriate to retain other control lines. Control functions have, therefore, to be encoded and, for this purpose, well-known telecommunication principles, as used with teleprinters, are available. In the context of the widely used ISO-7 code with seven data bits plus a parity bit, one available technique is to use ESC (data escape) which turns the immediately ensuing single byte from data into an address or command function. Another available technique is to bracket bytes between DLE SOH and DLE ETX; all such bytes are changed from data to addresses or command functions.

Abortive proposals have been made to link a highway to a distant device by connecting the highway to the near end of a serial link via a highway/serial interface and by connecting the far end of the serial link to the device via a serial/device interface. The highway/serial interface acts solely as a bus-extender which sends all data and all commands (including addresses), automatically coded, down the serial link to the serial/device interface which is the interface addressed in command operations involving the device. The main stumbling block preventing these proposals from being accepted is that, since all signals have to traverse the serial link, the operation of the system is badly slowed down, especially in the case of poll procedures.

Since speed of operation is being considered, it is convenient to mention here that it has also been proposed, in view of the difficulty of designing interfaces, to handle all necessary interface procedures to utilize only very rudimentary interfaces and to assign encoding, decoding and other special functions, to a computer (e.g., a microprocessor) inserted between two interfaces. In other words, some interface procedures are performed by software instead of being built into hardware. Quite apart from considerations of cost, the computing time involved is several orders of magnitude higher than the time taken by an interface which relies solely upon hardware. The present invention is concerned exclusively with interfaces in which all procedures are built into hardware.

SUMMARY OF THE INVENTION

One object of the present invention is to provide an interface which is capable of interfacing between a non-coded highway and a coded highway where the non-coded highway includes command lines which are absent from the coded highway and which provides coded commands on the coded highway in a selective manner such that operation of a system is not unnecessarily slowed by encoding all commands on to the coded highway.

According to the invention in a first aspect, there is provided an interface comprising a first port including a plurality of data terminals and a plurality of command terminals dedicated to predetermined command functions, a second port including at least one data terminal, an encoding circuit operative in response to at least some commands signalled on the command terminals, including universal commands, of the first port to provide corresponding data bytes encoding the commands, a circuit for selectively enabling data to be passed to the data terminal(s) of the second port, status circuits which establish statuses of the interface in accordance with commands fed thereto, including a status indicating that the interface has been addressed, and a circuit responsive to the absence of this status to disable the selective enabling circuit, thereby to prevent data bytes representing coded commands, including universal command, from being passed to the data terminal(s) of the second port unless the interface has been addressed.

Another object of the invention is to provide an interface for connecting two non-coded highways but which, when addressed on one port responds to non-coded commands on the other port to send encoded commands on the one port. As will be explained below, this enables a coded link to be established from one highway to another via two interfaces and an intervening highway with the advantage that everything on the intervening highway is coded and will, therefore, appear solely on that highway as data and will not affect other devices interfaced to the intervening highway.

According to the invention in a second aspect, there is provided an interface comprising a first port including a plurality of data terminals and a plurality of command terminals dedicated to predetermined command functions, a second port including at least one data terminal, an encoding circuit which is selectively operable in response to at least some commands signalled on the command terminals of the first port to feed corresponding data bytes encoding the commands to the data terminal(s) of the second port, status circuits which establish statuses of the interface in accordance with commands fed thereto through either port, including a status indicating that the interface has been addressed on the second port, and a circuit responsive to this status to enable the selectively operable coding circuit.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
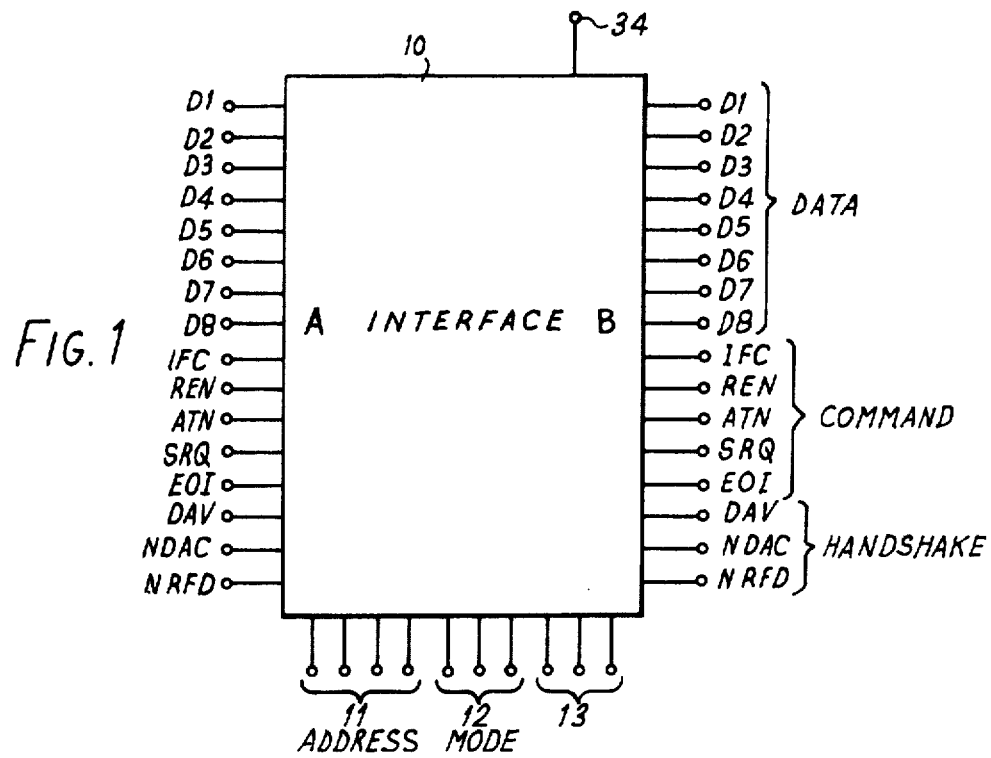
FIG. 1 shows the external terminals of an interface embodying the invention.

FIG. 1 shows the interface 10 with ports A and B, each of which comprises sixteen IEC terminals (data and control terminals), four terminals 11 for patching the address of the interface, three terminals 12 for patching the mode of the interface and terminals 13 for power V, power ground and signal ground.

Within the interface, the convention is that a signal at ground is false whereas a signal at the high voltage level is true. The high voltage level may be positive or negative, i.e., positive or negative logic may be employed. On all buses, i.e., at all external data and control terminals, the convention is that a signal at ground is true wheres a high voltage level signal is false. There is thus a logical inversion as between any signal on a bus terminal and that signal within the interface.

It is assumed that the circuits are implemented using TTL logic, in which the ground state is dominant. When a set of outputs is connected to a common point, that point will be clamped at ground level if any one or more of the outputs is driving at ground level and will only be at high voltage level when all of the outputs are driving at high voltage level.

The sixteen terminals for each port are labelled D1 to D8 for data, IFC, REN, ATN, SRQ and EOI for command lines and DAV, NDAC and NFRD for handshake lines. Patch terminals can be patched either to V or ground to represent 1 or 0 and the three mode patch terminals 12 can, therefore, patch eight different modes, called patch 1 to patch 8, in accordance with the binary codes 000 to 111. These modes are as follows:

TABLE I.

| Patch | Port A | Port B |
|-------|--------|--------|
| 1 | 16 wire bus (IEC) | Device |
| 2 | 8 wire bus | Device |
| 3 | Serial bus, synchronous | Device |
| 4 | Serial bus, asynchronous | Device |
| 5 | 16 wire bus (IEC) | 16 wire bus (IEC) |
| 6 | 8 wire bus | 16 wire bus (IEC) |
| 7 | Serial bus, synchronous | 16 wire bus (IEC) |
| 8 | Serial bus, asynchronous | 16 wire bus (IEC) |

Modes 3 and 4 and modes 7 and 8 are, for the purposes of the present invention, simple variants of modes 2 and 6 respectively, so it is largely possible to consider mode 2 with modes 3 and 4 and mode 6 with modes 7 and 8. When using an 8 wire bus, apart from SRQ, control functions are encoded as when using a serial bus but the data bytes are sent bit-parallel instead of bit-serial. Table I can, therefore, be reduced to Table II:

| Patch | Port A | Port B |
|-------|--------|--------|
| 1     | IEC    | Device |
| 2A    | 8W     | Device |
| 5     | IEC    | IEC    |
| 6A    | 8W     | IEC    | where IEC is used to symbolize an IEC 16 wire bus and 8W is used to symbolize a coded bus which may be an 8-wire bit-parallel bus (patch 2 or 6) or a 2-wire bit serial bus (patch 3, 4, 7 or 8) on which all bytes are sent in serial form.

In the case of any IEC port, the eight terminals DAV, NDAC, NRFD and IFC to EOI are used as labelled, in conformity with the abovementioned reference (2). In the case of any device port, these terminals are used as follows:

DAV used as nba, i.e., new byte available.
NDAC "    " busy.
NRFD "    " talk/listen.
EOI "     " end of message.
ATN "     " mode.
SRQ "     " request service.
REN "     " local enable.
IFC "     " reset.

The significance of "mode" will be explained below.

In the case of an 8-wire bus, only the handshake lines and SRQ are used. In the case of a serial bus, SRQ is used and it is preferred, for pin economy, to assign existing terminals to different functions. Such assignment is arbitrary but may be as follows:

Serial in/out       ATN
SRQ in/out          SRQ
Clock for serial    NDAC and NRFD.
synchronous If separate input and output terminals are required, e.g., when using optical couplers, ATN and SRQ are used for serial out and SRQ out only and IFC and REN are used for SRQ in and serial in.

Figure 2A:
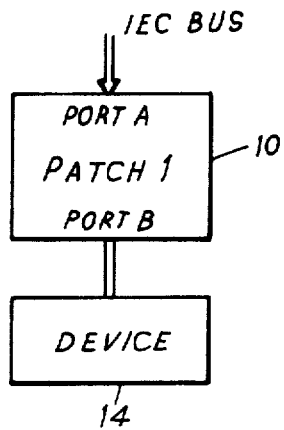
FIGS. 2A to 2D show various ways in which the interface can be used.
Figure 2B:
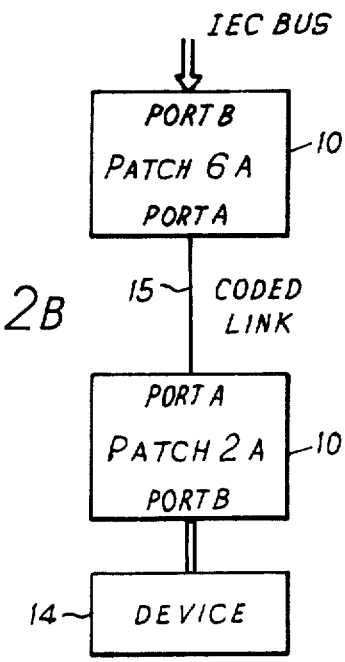
Figure 2C:
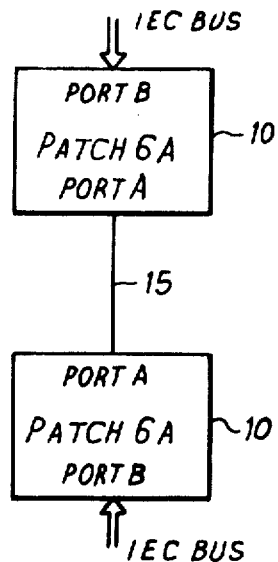
Figure 2D:
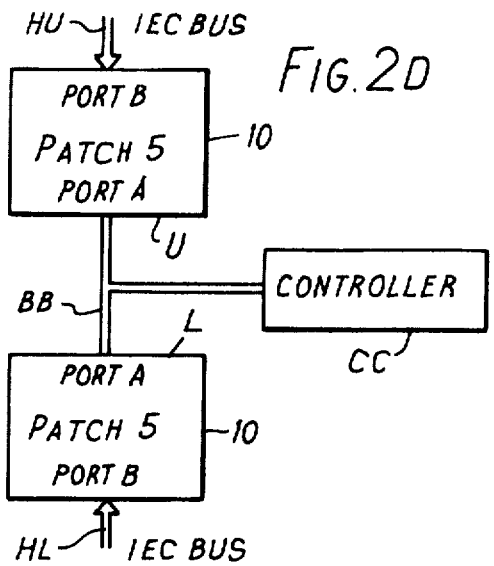

FIGS. 2A, 2B, 2C and 2D show several use situations for the interface. In FIG. 2A, a patch 1 interface is used in accordance with IEC proposals between an IEC bus and a device. In FIG. 2B, a patch 6A and a patch 2A interface are used to extend an IEC bus to a device 14 via a serial or 8-wire link 15, i.e., a coded link. In FIG. 2C, two patch 6A interfaces are used to link two highways via a coded link. In FIG. 2D, two patch 5 interfaces are used in the manner described in the aforementioned reference (4) to link three highways. An important additional usage of this configuration will be explained below.

Figure 3:
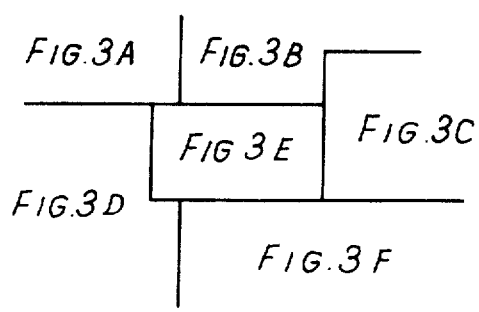
FIGS. 3A to 3F, assembled as shown in FIG. 3, form a complete block diagram of the interface.

A description of the complete circuit of the interface will now be given with reference to FIGS. 3 to 3F of the drawings, following which those blocks of the complete circuit which are relevant to the present invention will be described more fully. Firstly, it will be helpful to point out that, in denoting signals, subscript A and B refer to signals pertaining to port A and port B respectively. Subscript I denotes an internal signal and a prefix S denotes a command signal (e.g., SIFC) generated by decoding a coded command. It is envisaged that an interface will normally be controlled from port A so that IFC and REN in uncoded form can only enter at port A and leave at port B, although corresponding coded control signals can obviously be sent in the reverse direction.

Figure 3A:
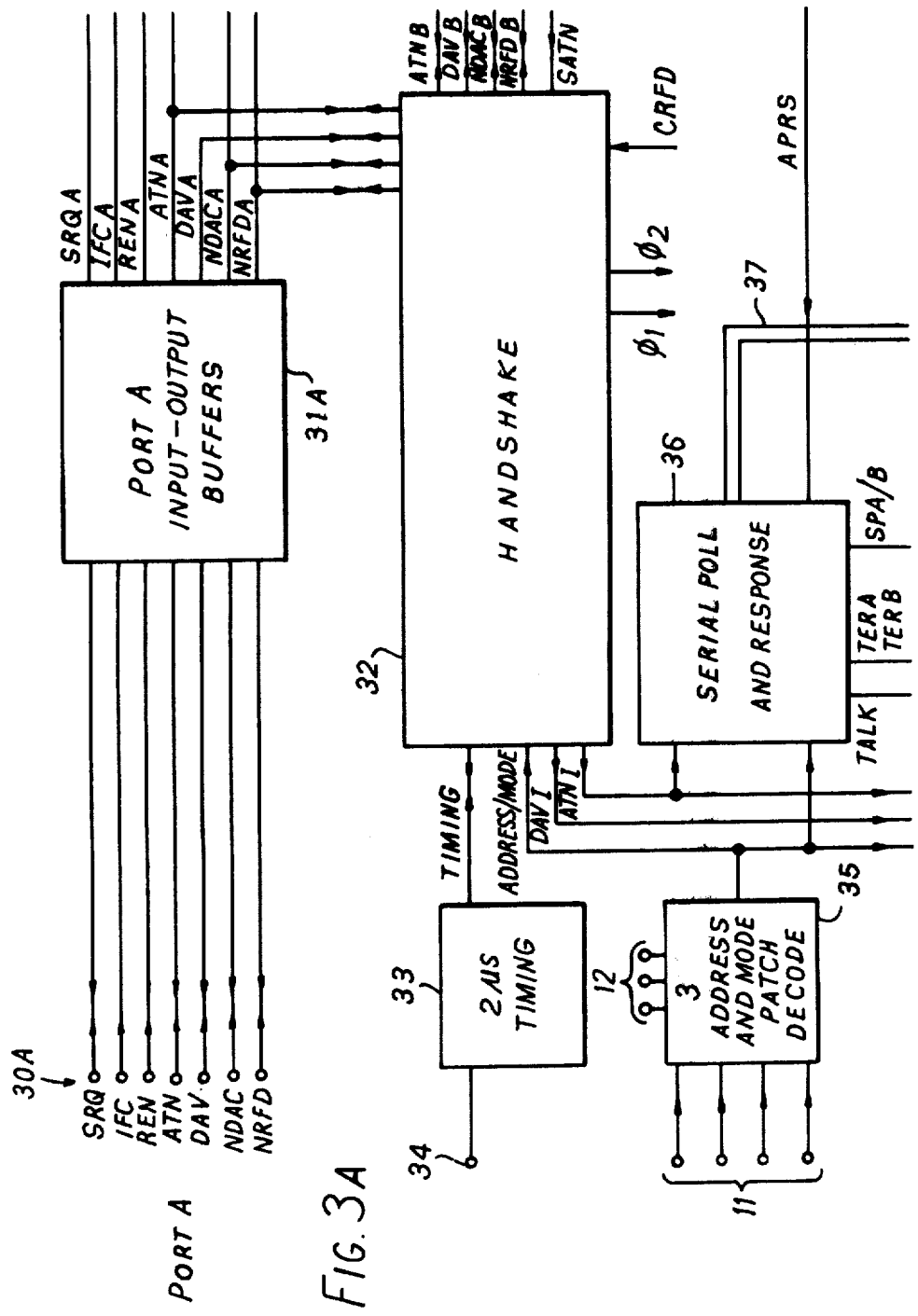

Referring then to FIG. 3A, all dedicated lines for port A, other than EOI have terminals 30A which are connected to input-output buffers 31A. Correspondly, terminals 30B and buffers 31B for port B are shown in FIG. 3B. $ATN_A$, $DAV_A$, $NDAC_A$ and $NRFD_A$ and the corresponding port B signals are also fed to a handshake circuit 32 which controls handshaking in accordance with the aforementioned reference (3) and will not be described in detail. Handshaking requires a 2 $\mu$s timing delay for data settling purposes and this is provided by a circuit 33 with a terminal 34 for connection of an external RC time constant circuit. The whole interface can be constructed on one integrated circuit chip, which necessitates the provision of the terminal 34, although it could also be assembled from off-the-shaft TTL integrated circuits.

A circuit 35 decodes the address and patch mode from the terminals 11 and 12 and the execution of handshaking is controlled in dependence upon the mode, such handshaking not being required for the serial port in serial modes. The handshake circuit also feeds out internal signals $ATN_I$ and $DAV_I$ and provides clock signals $\phi_1$ and $\phi_2$ in each handshake cycle for use in controlling bistables (bistable flip-flops) in a known manner such that each bistable is set or reset at one of $\phi_1$ and $\phi_2$ and its output is only used at the other of $\phi_1$ and $\phi_2$.

Each set of buffers 31A, 31B has, in respect of each of its seven lines, a threshold circuit such as a Schmidt trigger for passing into an IN terminal the signal from the corresponding terminal 30A, 30B and a high gain inverting amplifier for passing out the signal from an $\overline{\text{out}}$ terminal to the corresponding terminal 30A, 30B, except for the omission of threshold circuits and IN terminals in buffers 31B for $IFC_B$ and $REN_B$ and the omission of the amplifiers in buffers 31A for $IFC_A$ and $REN_A$ on account of the unidirectionality of these signals. In addition, latch circuits disable the input paths for ATN and NRFD when the output paths are driven, in order to prevent the setting up of bistable loops. Finally, the output amplifier for $\overline{ATN_B}$, is grated from the patch decode circuit 35 so that $ATN_B$ is fed out when port B is an IEC port (patches 5 to 8), whereas $ATN_B$ is fed out as "mode" when port B is a device port (patches 1 to 4).

FIG. 3A also shows a serial poll circuit 36 which puts a serial poll response on an internal bus 37 of the interface as controlled by a control ROM 50, including status bistables, shown in FIG. 3E. A serial poll response consists, in known manner, of a byte in which each bit denotes the state of a corresponding status bistable and is provided when the interface has been addressed terminally on port A or B (denoted by signals TERA, TERB whose derivation is explained below), has moreover been addressed as a talker (TALK) and has received a serial poll request (as denoted by SPA or SPB whose derivation is again explained below). Furthermore, a status signal APRS puts a bit into the response byte to indicate if the interface is the interface which was emitted SRQ to request service.

Turning now to FIG. 3B, a service request circuit 38 will pass on service requests provided that the interface is not in local status (LA, LB) or in lockout status (LO) and provided that APRS is not set (i.e., that the interface has not been serial polled during the presence of a service request) and can, moreover, generate $SRQ_A$ or SRQ$_B$ from SSRQ when SSRQ is decoded from a coded request for service.

A circuit 39 develops internal signals IFC$_I$ and REN$_I$ from IFC$_A$ and REN$_A$ and also passes out these signals as IFC$_B$ and REN$_B$ if the interface is patch 5. Equally, IFC$_B$ and REN$_B$ can be generated from SIFC and SREN when port B is an IEC port and SIFC or SREN are decoded from coded IFC and coded REN.

FIG. 3C shows a serial to parallel circuit 40 of known form (in accordance with ISO Recommendation 1177) which converts serial input data on ATN$_A$ into bit-parallel data on the internal bus 37 and a corresponding parallel to serial circuit 41 which converts bit-parallel data on the bus 37 into serial output data on ATN$_A$. The circuits 40 and 41 are served in known manner by bit counter 42 which is driven from a 2-phase clock oscillator 43 which is in turn slaved to the signals on NDAC$_A$ and NRFD$_A$ for synchronous operation.

A coded command decoder and encoder 44, which will be described in detailed below, decodes coded commands on the internal bus 37 into SIFC, SREN, SSRQ and SATN, performs coding of commands into bytes on the bus 37 and modification of secondary addresses to primary addresses.

Referring now to FIG. 3D, data flow into and out of the data terminals of the ports A and B is controlled by a data flow control circuit 46 in dependence upon the mode, various status signals and ATN$_I$ and DAV$_I$ which synchronize the enabling of input buffers and output drivers with the handshake cycle. This control is effected by signals A OUT ENA which enables data to pass from the internal bus 37 through port A output drivers 47A to port A data terminals 48A, A IN ENA which enables data to pass to the internal bus 37 from the port A terminals 48A through A input buffers 49A (FIG. 3F), and corresponding B port signals B OUT ENA and B IN ENA controlling port B drivers 37B and input buffers 49B.

Figure 3F:
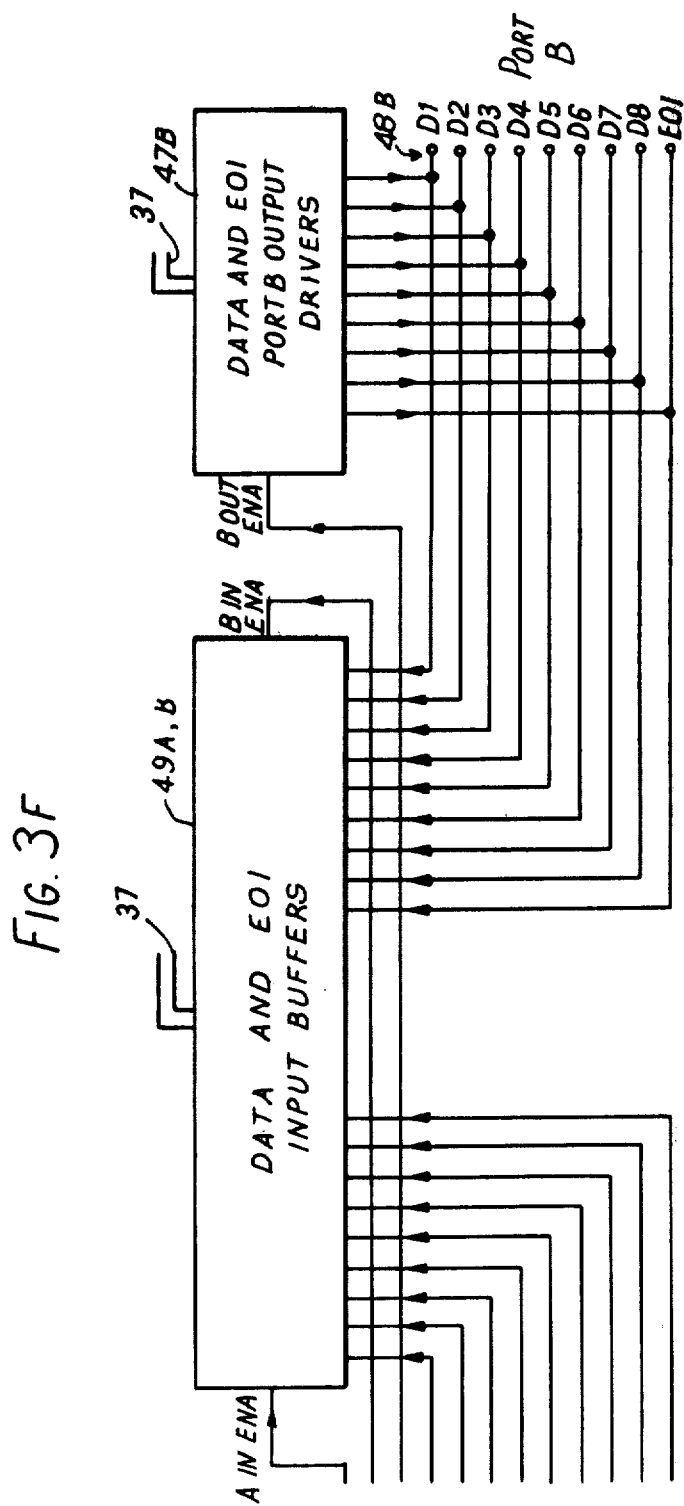

As is apparent from FIGS. 3D and 3F, the terminals 48A and 48B include not only the data terminals D1 to D8 but also EOI since, although EOI is a command signal it is normally gated through with data.

FIG. 3E shows a control ROM and a parallel poll response circuit 51. The latter operates in known manner to provide a response to the simultaneous appearance of ATN and EOI, the response consisting of a byte on the internal bus 37 with a particular bit equal to 1 if the interface is the interface which has requested service. The control ROM 50 includes among its status bistables a three-bit register whose contents determine the parallel poll response; this register can be configured by a controller to determine the parallel poll response. This is a known technique for parallel polling. The control ROM also includes status bistables for the signals APRS, SPA, SPB, LA, LB, LO, TALK, LIST (Listen), TERA, TERB and a signal ATOB to be described below.

A more detailed description will now be given of parts of the circuit of significance to the present invention. It must firstly be explained that the internal bus 37 is an 18-wire bus which carries not only signals corresponding to D1 to D8 and EOI but the inverted signals; the bus is thus composed of a true bus and an inverted bus. The bus signals are given distinguishing symbols as in the following Table:

TABLE III

| Data Terminal | True Bus Wire | Inverted Bus Wire |
|---|---|---|
| D1 | B1 | $\overline{B1}$ |
| D2 | B2 | $\overline{B2}$ |
| D3 | B4 | $\overline{B4}$ |
| D4 | B8 | $\overline{B8}$ |
| D5 | C1 | $\overline{C1}$ |
| D6 | C2 | $\overline{C2}$ |
| D7 | C4 | $\overline{C4}$ |
| D8 (Parity Bit) | D8 | $\overline{D8}$ |
| EOI | EOI | $\overline{EOI}$ |

Figure 4:
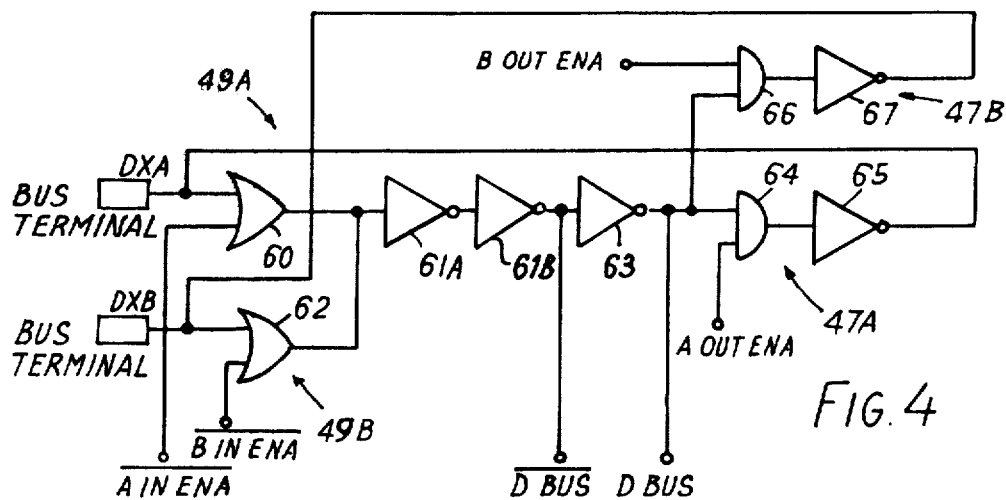
FIG. 4 is a block circuit diagram of an input buffer and output driver for gating one bit in and out of the interface.

Generically, any data terminal is denoted DXA or DXB for port A or port B respectively and the corresponding true and inverted bus wire are D BUS and $\overline{D\ BUS}$. FIG. 4 shows the buffers and drivers pertaining to one bit. $\overline{A\ IN\ ENA}$ clamps the output of an OR gate 60 to block DXA. When A IN ENA is true (and hence $\overline{A\ IN\ ENA}$ is false), DXA appears at the output of the OR gate, is buffered by two inverting amplifiers 61A and 61B to become $\overline{D\ BUS}$, bearing in mind that the signal on the external terminal is logically inverted relative to the signal within the interface. Similarly, B IN ENA enables DXB to appear at the output of an OR gate 62 and become $\overline{D\ BUS}$. Another inverting amplifier 63 inverts $\overline{D\ BUS}$ to provide D BUS. A OUT ENA enables an AND gate 64 to allow D BUS to pass through an inverting amplifier 65 to become DXA and B OUT ENA enables an AND gate 66 to allow D BUS to pass through an inverting amplifier 67 to become DXB. An important feature of this arrangement is that the encoder 44 (FIG. 3C) can write a byte over an input byte as follows. $\overline{D\ BUS}$ and D BUS can both be pulled to 0 regardless of whether amplifiers 61B and 63 respectively are signalling 0 or 1. If, therefore, an overwriting byte has a bit=0, this can be forced by putting 0 on D BUS. In the case of a bit=1, this can be forced by putting 0 on $\overline{D\ BUS}$ which will become 1 on D BUS.

The bus bits B1-B8 and C1 to C4 are so labelled in accordance with the scheme whereby the meanings of ISO bytes and command bytes are tabulated. Bits B1 to B8 (with binary weights 1, 2, 4 and 8) determine the row of the table and bits C1 to C4 determine the column. This is shown in Table IV:

TABLE IV.

| | 0 | 1 | 2 | 3 | 4 | 5 | 6 | 7 | ←COLUMN |
|---|---|---|---|---|---|---|---|---|---|
| C4→0 | 0 | 0 | 0 | 1 | 1 | 1 | 1 | | |
| C2→0 | 0 | 1 | 1 | 0 | 0 | 1 | 1 | | |
| C1→0 | 1 | 0 | 1 | 0 | 1 | 0 | 1 | | |

| | ROW |
|---|---|
| 0000 | 0 |
| 0001 | 1 |
| \| | \| |
| 1111 | 15 |

TABLE IV.-continued

```
  0     1     2     3     4     5     6     7    ← COLUMN

↗  ↑  ↑  ↖
B8  B4 B2  B1
```

In standard ISO7 code columns 0 and 1 carry various command functions such as ACK, ESC, DLE while columns 2 to 7 carry various typographical symbols, numerals 0 to 9 (in column 3), upper case letters (in columns 4 and 5) and lower case letters (in columns 6 and 7). In practising the present invention, the same columns can be changed to provide command functions either by accompanying the byte by ATN or preceding the byte by ESC. Columns 0 to 5 then carry primary commands as follows:

TABLE V.

| Column | |
|---|---|
| 0 | Addressed commands. |
| 1 | Universal commands. |
| 2 | Listen addresses - intermediate. |
| 3 | Listen addresses - terminal. (Row 15 is UNL - unlisten). |
| 4 | Talk addresses - intermediate. |
| 5 | Talk addresses - terminal. (Row 15 is UNT - untalk). |
| 6 | Secondary commands which become the corresponding addressed commands of column 0 when converted to primary commands or become intermediate addresses when C4 or C2 is put to 0. |
| 7 | Secondary commands which become the corresponding universal commands of column 1 when converted to primary commands or become terminal addresses when C2 or C2 is put to 0. |

Examples of addressed commands in column 0 are GTL, go to local, in row 1; PPC, parallel poll configure, in row 5; and TCT, take control, in row 9. The universal commands and the codes corresponding to the command lines appear in Table VI:

TABLE VI.

| Column 1 | | |
|---|---|---|
| Row | Command | Meaning. |
| 1 | LLO | Local lock-out. |
| 2 | $\overline{SRQ}$ | Not service request. |
| 3 | SRQ | Service request. |
| 7 | EOI | End or identity. |
| 8 | SPE | Serial poll enable. |
| 9 | SPD | Serial poll disable. |
| 10 | $\overline{ESC}$ | Not escape data. |
| 11 | ESC | Escape data. |
| 13 | $\overline{REN}$ | Not remote enable. |
| 14 | IFC | Interface clear. |

Terminal addresses address interfaces directly. Secondary addresses are passed on as corresponding terminal addresses by an already addressed interface, thereby to address interfaces beyond the already addressed interface. See the aforementioned reference (4).

Figure 5:
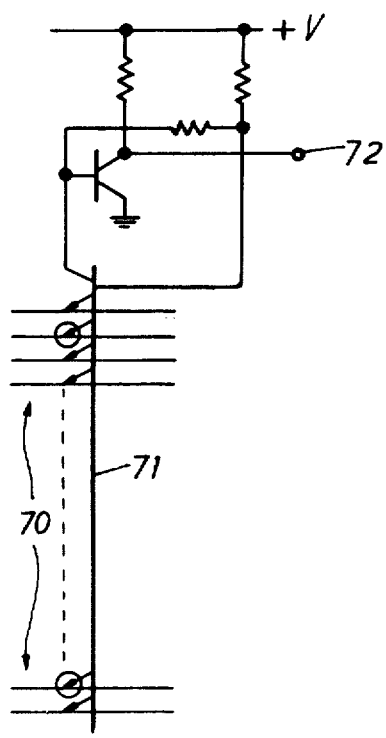
FIG. 5 is a circuit diagram of one column of a ROM decoder.

The nature of the control ROM 50 will next be considered. This can be considered as a ROM matrix of rows and columns wherein the rows are inputs to the matrix and each column comprises a multi-emitter transistor inverter. Selected emitters are connected to the crossing rows and the output of the inverter is true unless all such connecting rows are true, when the inverter output becomes false. So long as the drive to any connecting row is false, the false input to the transistor is dominant and the output is true. The circuit for one column is shown in FIG. 5. The row wires 70 cross the emitters of a transistor 71 but are only connected where shown by circles. The output at terminal 72 is true so long as at least one connected emitter is false but goes false when all connected emitters are true.

Figure 6:
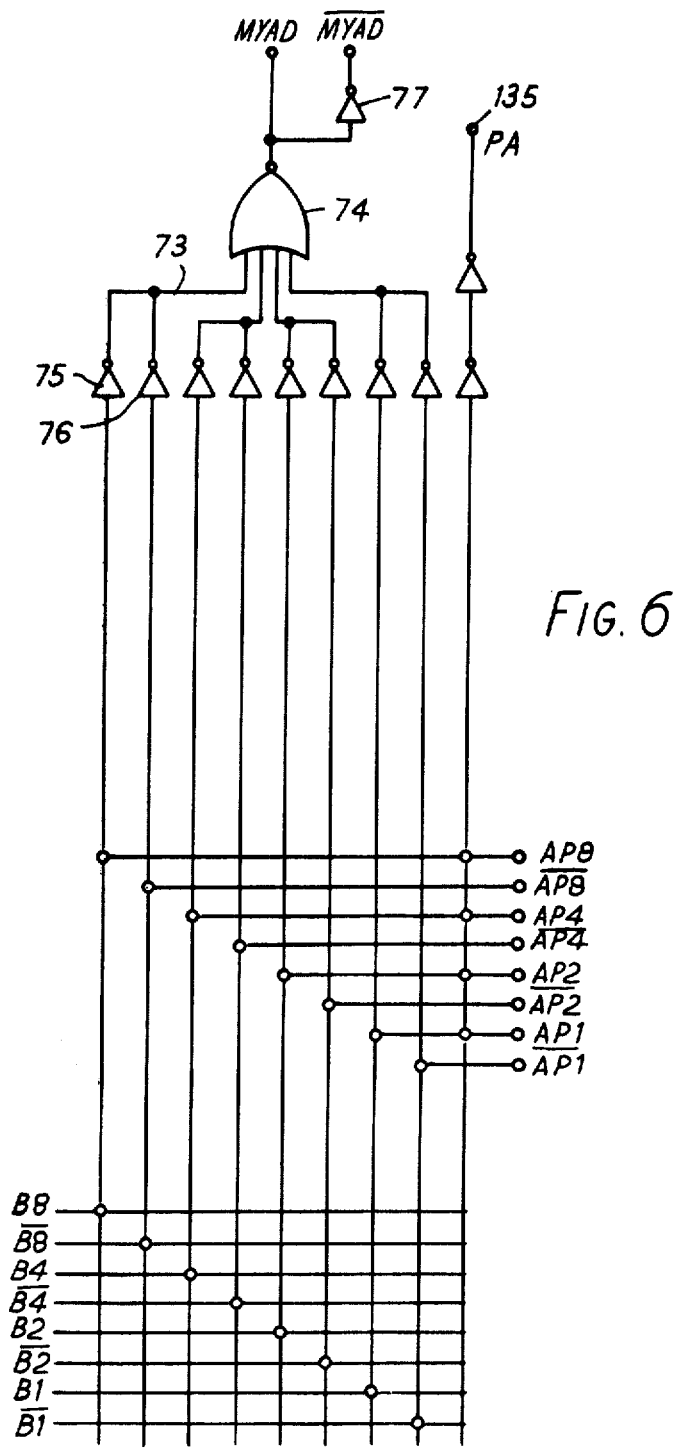
FIG. 6 is a diagram of a circuit whereby the interface decodes its own address.

One function of the ROM 50 is to decode the interfaces own address. The circuit is shown in FIG. 6 and the row wires are B1, $\overline{B1}$ to B8, $\overline{B8}$ and AP1, $\overline{AP1}$ to AP8, $\overline{AP8}$. The four address patch terminal 11 (FIG. 3A) provide a four-bit interface address on AP1 to AP8 and inverters (not shown) provide $\overline{AP1}$ to $\overline{AP8}$. In FIG. 6, an input 73 to a NOR gate 74 can only be pulled false by inverter 75 if $\overline{B8}=AP8=1$ or by inverter 76 if $B8=\overline{AP8}=1$. Thus, all four inputs to the gate will only be false if all address patch bits match the corresponding bits on the data bus 37. The gate 74 then provides MYAD (my address) and, via an inverter 77, $\overline{MYAD}$. If all AP1 to AP8 are true, the interface is permanently addressed as signalled by PA on terminal 135. This signal is used to render the interface data-transparent when required in a special situation. If port B is a device port (patches 1 to 4), only data is passed on, e.g., to a teletype machine. If port B is an IEC port (patches 5 to 8), all messages are passed on and the interface merely becomes a bus extender. An interface which is permanently addressed does not need the TALK or LIST bistable to be set in order for data or commands to be sent on. Indeedm when PA is true, the state of status bistables is unaffected by any commands.

The remainder of the ROM 50 will not be illustrated; it is constructed on the same principles as have been illustrated in FIGS. 5 and 6 using as row inputs the lines of the data bus 37, MYAD, lines corresponding to the commands (IFC, ATN, etc.) and lines fed back from its own outputs. These outputs are provided by the status bistables which are set and reset by the columns of the matrix. $\phi_1$ and $\phi_2$ are, therefore, also included in the row inputs. Also, ATN has to be present to show that a command is involved. The logic involved in controlling the more important status bistables will, however, be explained.

TALK bistable: Set on $\phi_2$ by own talk address, i.e., by $C4.\overline{C2}.MYAD.\phi_2.ATN$ since $C4=1$ and $C2=0$ denotes a talk address.

Reset on $\phi_1$ by any talk address ($C4.\overline{C2}.\phi_1.ATN$—which includes UNTALK—or by its own listen address if device patched ($\overline{C4}.C2.MYAD.DEVP.\phi_1.ATN$) or by interface clear (IFC) or by take control ($TCT.\phi_2.ATN$).

LIST (listen) bistable: Set by own listen address ($\overline{C4}.C2.MYAD.\phi_2.ATN$)

Figure 12:
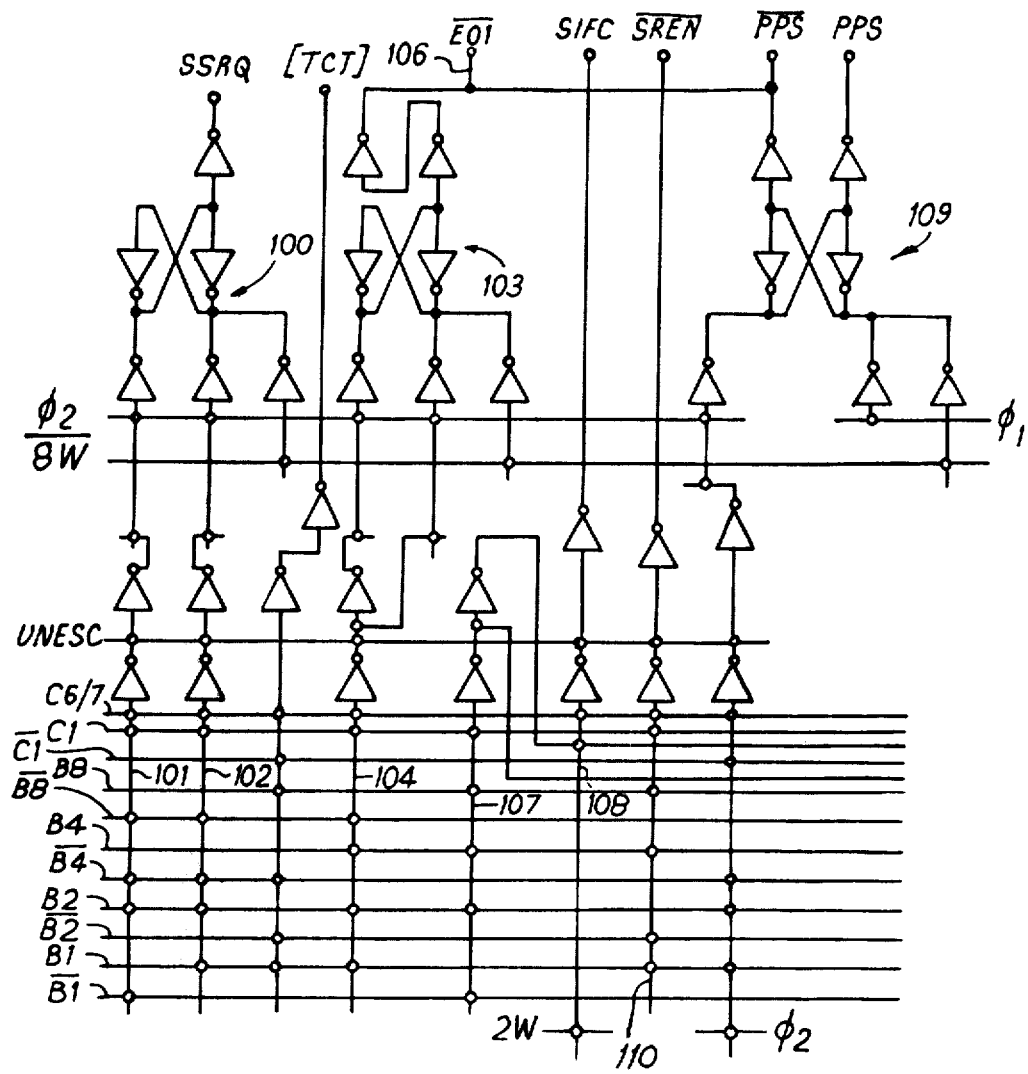

Reset by unlisten $\overline{C4}.C2.C1.B8.\overline{B4}.B2.B1.\phi_2.ATN$) or by its own talk address if device patched (DEV P. MYAD.C4.$\overline{C2}.\phi_2$.ATN) or by interface clear (IFC) or by [TCT].ATN$_I.\phi_2$. Unlisten is, of course, decoded from B8.$\overline{B4}$.B2.B1 = 1 in conjunction with $\overline{C4}$.C2.C1 = 1 and other commands are decoded similarly in accordance with Tables V and VI. The decode of [TCT], the coded version of TCT, is shown in FIG. 12. TCT is used to hand over control from one controller to a second controller. In the IEC-IEC case (Patch 5), TCT resets the TALK bistable as it is passed on (see above). In the 8W - IEC case (Patch 6A), coded TCT (i.e., [TCTI]) is passed on as TCT when the interface is in the listen state, that is to say, ESC, TCT on the 8W side provides TCT on the IEC side, and [TCT] resets the LIST bistable. TALK or LIST allows data through, in either direction and in the absence of ATN.

Figure 7:
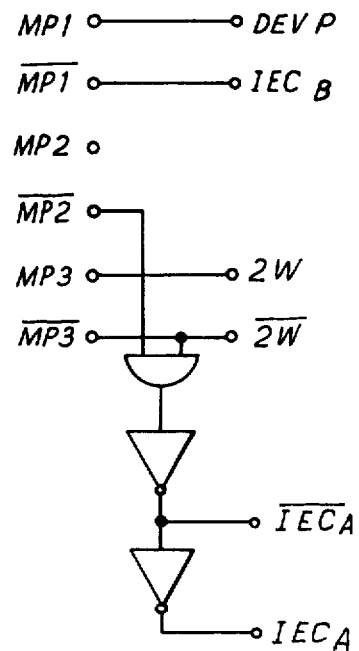
FIG. 7 is a circuit diagram showing how the mode of the interface is determined by patching three terminals.

The signal DEV P is one signal decoded from the mode patch terminals 12 which are identified MP1 to MP3 in FIG. 7. The meanings of the different bit combinations are given in Table VII:

TABLE VII.

| | PORT A | | | PORT B | |
|---|---|---|---|---|---|
| MP2 | 0 | 1 | MP3 | MP1 | |
| 0 | IEC$_A$ | 8W(2W) (sync) | 0 | | IEC$_B$ |
| 1 | 8W | 8W(2W) (async) | 1 | | DEV P | where IEC$_A$ and IEC$_B$ mean port A and port B are IEC bus ports, respectively, DEV P means port B is a device port and 8W and 8W(2W) mean port A is respectively an 8-wire coded port and a 2-wire serial coded port. Thus, (FIG. 7) MP1 and $\overline{MP1}$ give DEV P and IEC$_B$ directly, MP3 and $\overline{MP3}$ give 2W and $\overline{2W}$ directly, the inverted AND of $\overline{MP2}$ and $\overline{MP3}$ provides $\overline{IEC_A}$ which, again inverted yields IEC$_A$.

Table VIIA corresponds to Table VII but denotes the decoding in accordance with the patch number given above:

TABLE VIIA.

| | PORT A | | | PORT B | |
|---|---|---|---|---|---|
| MP2 | 0 | 1 | MP3 | MP1 | |
| 0 | Patch 1 or 5 | Patch 3 or 7 | 0 | | Patch 5, 6, 7 or 8 |
| 1 | Patch 2 or 6 | Patch 4 or 8 | 1 | | Patch, 1, 2, 3 or 4 |

JCOM (just command) bistable:

Set on $\phi_2$ by any primary command or own talk or listen address (i.e., by any command in columns 0, 1, 2 and 4) and then allows onward transmission of any secondary commands. JCOM is thus set by $\overline{C4}$. $\overline{C2}$. $\phi_2$ . ATN or by C4. $\overline{C2}$. $\overline{C1}$. MYAD . $\phi_2$. ATN or by $\overline{C4}$. C2. $\overline{C1}$. MYAD. $\phi_2$. ATN. Reset on $\phi_1$ by anything other than a secondary command, i.e., by $\overline{C4}$. $\overline{C2}$. $\phi_1$ . ATN (which excludes columns 6 and 7).

JADT (just addressed as talker) bistable:

Set on $\phi_2$ by own talk address provided not device patched and used for modifying an onwards transmitted address from a secondary address to a primary talk address. JADT is thus set by IEC$_B$. MYAD.C4. $\overline{C2}$ . $\phi_2$ . ATN.

Reset on $\phi_1$ by any primary command or on $\phi_2$ by a secondary command, i.e., by $\overline{C4}$. $\overline{C2}$ . $\phi_1$ . ATN or by C4.C2. $\phi_2$. ATN.

JADL (just addressed as listener) bistable:

Set on $\phi_2$ by own listen address provided not device patched, i.e., by IEC$_B$. MYAD. $\overline{C4}$. C2. $\phi_2$. ATN and used for modifying an onwards transmitted address from a secondary address to a primary listen address and to enable onward transmission of a secondary address from a coded message.

Reset on $\phi_1$ by any command which is not a secondary command (column 6 or 7) and on $\phi_2$ by a secondary command in columnn 6, i.e., reset by $\overline{C4}.\overline{C2}.\phi_1$. ANT or by C4. C2. $\overline{C1}$. $\phi_2$. ATN. This bistable can thus be reset on $\phi_1$ by its own listen address but will immediately be set again on $\phi_2$ by this address.

TERA (addressed terminally at port A) bistable:

Set on $\phi_1$ by own terminal address at port A and reset on $\phi_1$ by own intermediate listen address at port A and reset by IFC. TERB corresponds to TERA but for port B. C4, C2, $\overline{C4}$ and $\overline{C2}$ are decoded to provide a signal COL 2–5 indicating a command from any of columns 2 to 5, i.e., any address. COL 2–5 = $\overline{C4} . \overline{C2}$ OR $\overline{C4} . \overline{C2}$. TERA is set by COL 2–5. DAV$_A$. MYAD. C1. $\phi_1$.ATN while TERB is set by COL 2–5. DAV$_B$. MYAD. C1. $\phi_1$.ATN.

TERA is reset by COL 2–5. DAV$_A$. MYAD. $\overline{C4}$. $\overline{C1}$. $\phi_1$ . ATN or by IFC and TERB is reset by COL 2–5. DAV$_B$. MYAD. $\overline{C4}$. $\overline{C1}$. $\phi_1$. ATN or by IFC. Signals INTA and INTB (intermediately addressed) are actually $\overline{TERA}$ and $\overline{TERB}$ respectively, being taken off the opposite outputs of the bistables from TERA and TERB.

SPA and SPB (serial poll) bistables: Each set on $\phi_2$ by SPE at its port and reset on $\phi_2$ by SPD at its port or by IFC. SPE and SPD are decoded in accordance with TABLE VI while the ports are decoded from DAV$_A$ and DAV$_B$.

APRS (affirmative poll response) bistable:

Set on $\phi_1$ of service request if service is requested and the circuit is serially polled at either port (SPA or SPB). The setting condition for SPA, by way of example, is SPA. TERA. TALK. RSV$_A$. $\overline{ATNI_B}$. $\phi_1$ . Reset if service is no longer required on the opposite side of the interface from which it was last addressed. The A reset condition is thus $\overline{ATOB}$. $\overline{RSV_B}$ where the significance of ATOB is explained immediately below. The use of APRS has already been described.

ATOB (bias) bistable:

This is used to enable ATN to be passed only in the direction from the controller which has last controlled the interface, and SRQ to be passed only in the opposite direction. ATOB is set by IFC (since the interface is always arranged with port A facing the direction from which control normally comes). ATOB is also set by COL 2–5. DAV$_A$. MYAD. $\phi_2$. ATN and is reset by COL 2–5. DAV$_B$. MYAD. $\phi_2$. ATN.

LA and LB (local) bistables stop the interface from passing on data provided $\overline{TALK}$ is present until it is addressed and are set by an addressed command GTL (go to local) decoded from the data bus and reset by their own listen address on their own bus. Thus:

LA is set by LIST. TERA. GTL. DAV$_A$. $\phi_2$. ATN or by $\overline{REN}$ or by TCT. $\phi_2$. ATN.

LA is reset by MYAD. C2. $\overline{C4}$. DAV$_A$. $\phi_2$.ATN.

LB is set by LIST. TERB. GTL. DAV$_B$. $\phi_2$. ATN or by TCT.$\phi_2$. ATN.

LB is reset by MYAD. C2. $\overline{C4}$. DAV$_B$. $\phi_2$. ATN or by $\overline{REN}$.

LO (lockout) bistable is set by an addressed command LLO (local lockout) decoded from the data bus and LO.LA and LO.LB inhibit the handshake at port B and port A respectively. More specifically, LO is set by:

LL0. TERA. DAV$_A$. $\overline{2W}$. $\phi_2$. ATN or

LLO. TERB. DAV$_B$. $\phi_2$. ATN or

LLO. DEV$_P$. $\overline{2W}$. $\phi_2$. ATN

LO is reset by $\overline{REN}$.

Having thus described the derivation of the various status signals, it is possible to turn to the functions which the interface performs in its different modes.

Device Patch: (Patch 1, 2, 3 or 4) denoted by DEV P or $\overline{IEC_B}$.

In this mode, commands at port A are decoded if necessary (patch 2, 3 or 4) and communication between the controller and the device is essentially conventional. The device patch will not, therefore, be considered in great detail except to explain how coded commands are decoded.

IEC Patch on Port A and Port B (Patch 5) denoted by IEC$_A$ and IEC$_B$.

In this mode, the interface acts as described in the aforementioned reference (4). Consider the case in which a controller is on the port A side and, as in reference (4) and in accordance with Table V above, denote commands as follows:

P = primary command (columns 0 to 5 of Table IV).
S = secondary command (column 6 or 7 of Table IV, C4=C2=1).
T = terminal address.
I = intermediate address.

PT on A addresses the interface as a talker or listener (JCOM) and allows onward transmission of secondary commands. What is more, it renders port A, i.e., the addressed port, a coded port by virtue of TERA so that, if commands are sent to port B, they will be sent on as coded commands from port A (and coded commands at port A will be decoded at port B). This provides a facility which can be explained, with reference to FIG. 2D in which the upper and lower interfaces will now be denoted U and L with the IEC busses on ports B denoted HU and HL. The interfaces are connected by a bus BB to which is connected a controller CC. It is assumed that at least HU is also connected back to another controller. If now CC emits the addresses UPT and LPT (without SPE) communication between HU and HL is possible with all commands encoded on bus BB. This means that commands passing between HU and H1 appear simply as data on BB and will, therefore, be without any effect upon other devices on the highway BB.

PI on A establishes what is referred to in reference (4) as the interhighway status in which secondary commands sent to A are sent on from B as primary commands, in the case where ATN is absent from the secondary command and is added by the interface to the primary command at port B. In the present application, the interhighway status is JADT or JADL. When a secondary command is sent on, it terminates the interhighway status but only if it is an intermediate address in the case of JADL (see the conditions above for reset of JADT and JADL).

Coded Patch (Patch 6, 7 or 8) denoted by 8WA. In this mode, commands on port B are sent on from port A as coded commands subject to the most important proviso that the interface must have been addressed.

Figure 8:
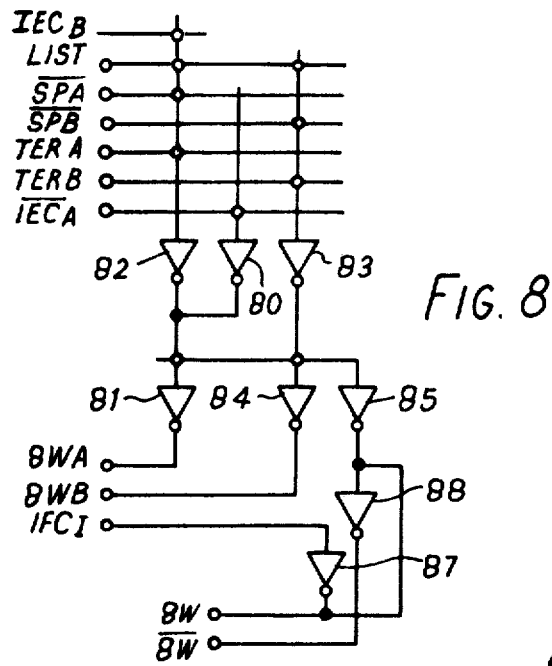
FIG. 8 is a circuit diagram showing the derivation of further mode signals in dependence upon addressing as well as patching of the interface.

The circuits which enable these functions to be performed and which together make up block 44 of FIG. 3C will now be described. FIG. 8 shows the circuit which determines whether or not a port is coded. The derivation of IEC$_A$ has been shown above (Table VII) and port A must be coded if IEC$_A$. Port A must also be coded (see above under IEC Patch on Port A and Port B) if port A is terminally addressed as a listener without SPA, provided port B is an IEC port. Similarly, port B must be coded if port B is terminally addressed as a listener without SPB. In accordance with this, it can be seen from FIG. 8 that 8WA is provided by $\overline{IEC_A}$ via inverters 80 and 81 or by TERA. $\overline{SPA}$. LIST. IEC$_B$ via inverters 82 and 81. 8WB is provided by TERB. $\overline{SPB}$.LIST via inverters 83 and 84. 8W is provided via inverter 85 in the presence of 8WA or 8WB except that it is locked out in the presence of IFC$_I$ (inverter 87) because IFC in uncoded form must never be passed. $\overline{8W}$ is provided from 8W by an inverter 88. IFC$_I$ is merely IFC$_A$ gated with IEC$_A$.

Figure 8A:
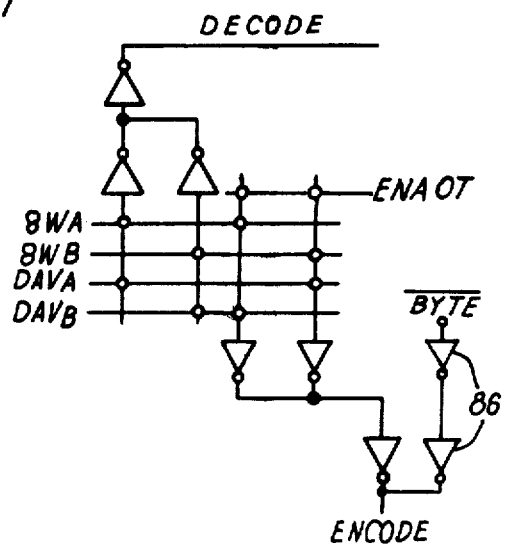
FIG. 8A shows how mode signals are used to determine whether the interface encodes or decodes command functions.

FIG. 8A shows the circuit which determines when decoding and encoding take place. A signal DECODE is generated when there is data available at a (DAV$_A$) in the presence of 8WA or when there is DAV$_B$ in the presence of 8WB. It is furthermore arranged (under control of the mode patching) that DAV$_A$ is provided when port A is a serial port and handshake signals are not then used. An ENCODE signal is provided in the presence of DAV$_A$ with 8WB or the presence of DAV$_B$ with 8WA, subject in either case to the presence of ENA OT (enable onward transmission—see below). A signal BYTE, to be explained below, removes the encode signal ($\overline{BYTE}$ applied to inverters 86) once the encoding status has been set up.

Figure 9:
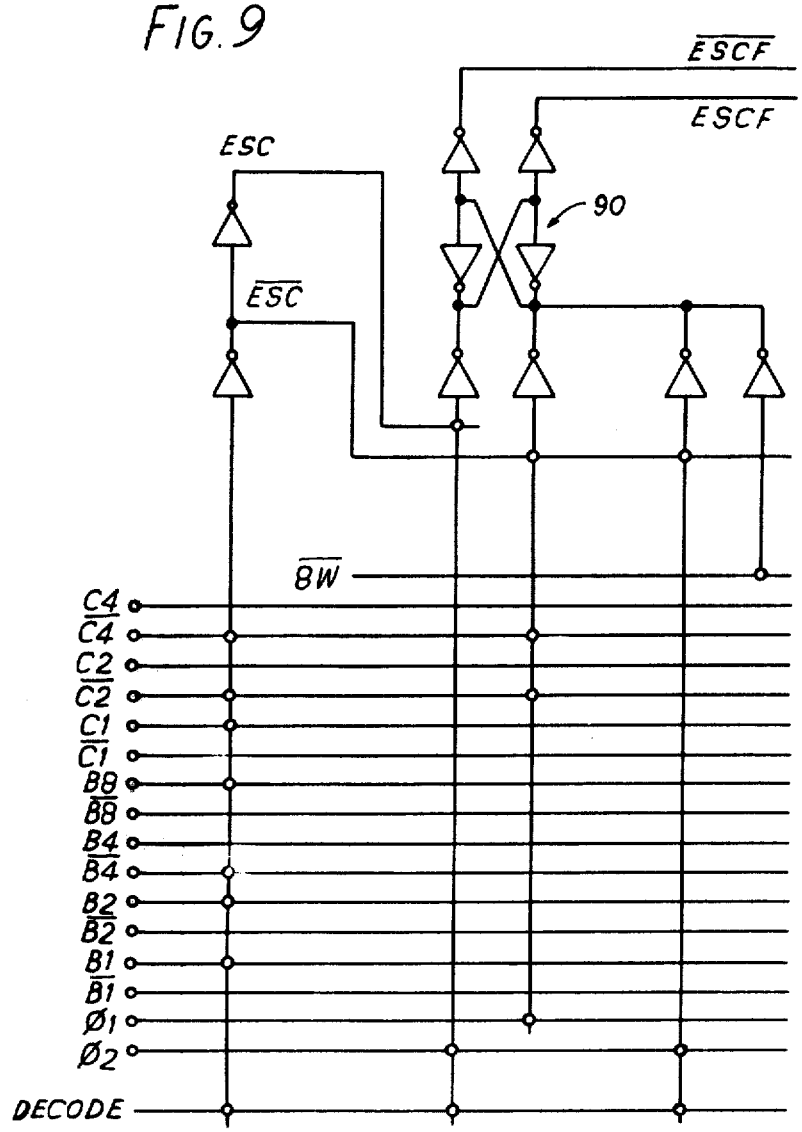

FIG. 9 shows the circuit which decodes ESC in accordance with $\overline{C4}$. $\overline{C2}$. C1. B8. $\overline{B4}$. B2. B1. in the presence of DECODE. ESC is buffered in a bistable 90 as ESCF.

Figure 10:
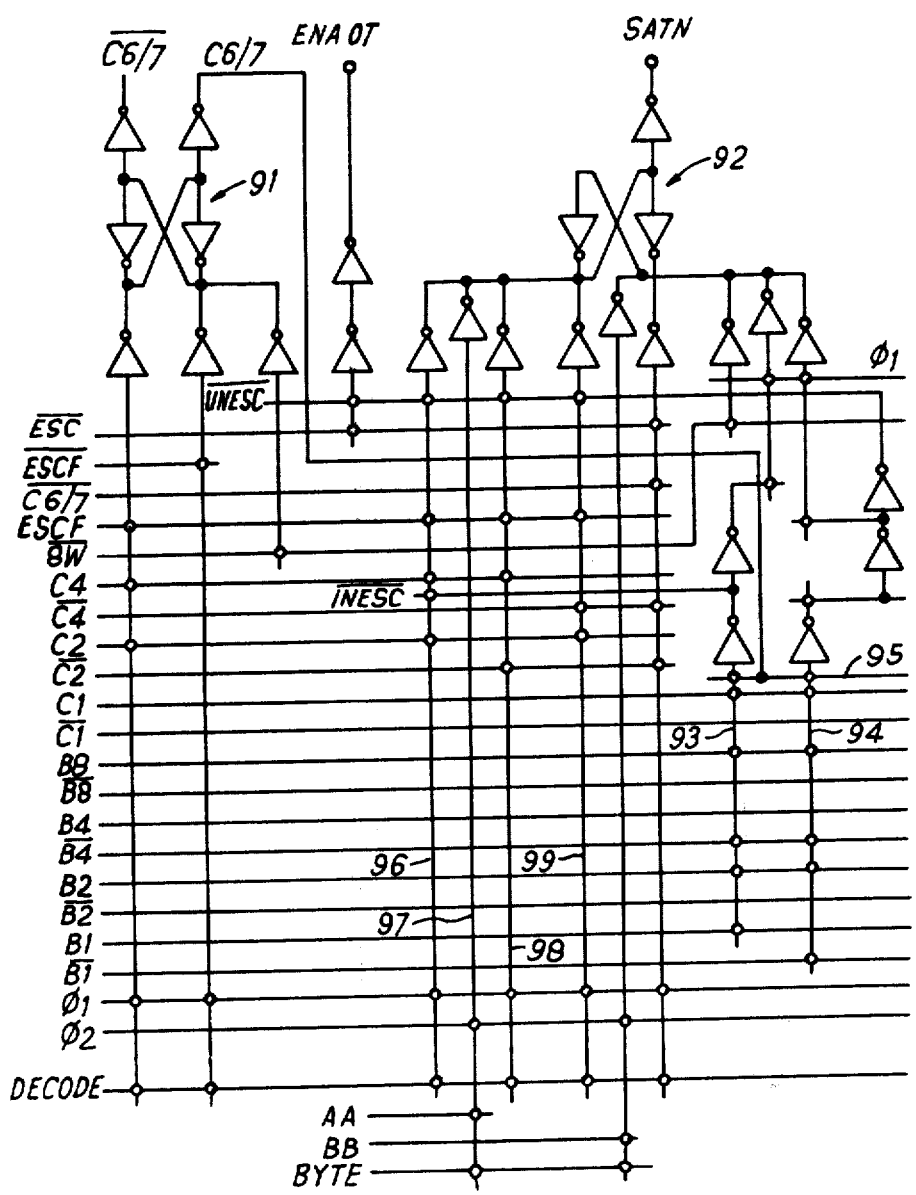

FIG. 10 shows the circuit which determines when there is a secondary command to be converted to a primary command and which provides SATN. A secondary command is denoted by C4=C2=1 which sets a bistable 91 on $\phi_1$ to provide C6/7 (i.e., column 6 or 7 of Table V) in the presence of DECODE and ESCF. C6/7 is reset by DECODE. $\overline{ESCF}$. $\phi_1$.

SATN is provided by a bistable 92 which has a number of columns of a ROM for setting SATN. Use is made of coded ESC and $\overline{ESC}$ decoded in accordance with Table VI by ROM columns 93 and 94 and the decoded signals are denoted on FIG. 10 as INESC and UNESC respectively with their inversions $\overline{INESC}$ and $\overline{UNESC}$. These signals are only decoded by the presence of C6/7 on ROM row 95 with the corresponding C1, B8, B4, B2 and B1 bits.

SATN is set from column 96 by $\overline{UNESC}$. $\overline{ESCF}$. $\overline{INESC}$. C4.C2. DECODE .$\phi_1$ i.e., by a secondary command other than ESC or $\overline{ESC}$. SATN is set on $\phi_2$ from column 97 by a signal AA whose derivation is explained below. SATN is set from column 98 by $\overline{UNESC}$. ESCF. $\overline{C4}$.C2. DECODE. $\phi_1$ i.e., by a primary or secondary talk address. SATN is set from column 99 by UNESC. ESCF.C4.C2. DECODE. $\phi_1$ i.e., by a primary or secondary listen address.

Figure 11:
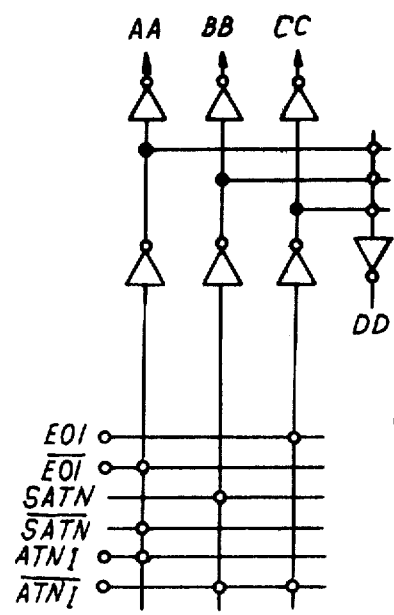
FIGS. 9 to 14 show the circuits which make up the coded command decoder and encoder, FIGS. 9, 10 and 12 effecting decoding, FIGS. 13 and 14 effecting encoding and FIG. 11 deriving four signals used in determining what encoding is required.

The resetting of SATN will not be described in detail; the circuit is complete in FIG. 10 but it should be noted that one reset is provided by a signal BB. FIG. 11 shows the derivation of AA and BB. AA is seen to be given by EOI. $\overline{SATN}$. ATN$_I$ and AA thus enables SATN to be sent on from ATN$_1$. BB is given by SATN. ATN$_I$ which is one condition for terminating SATN. The circuit of FIG. 11 also yields other signals which are used (see below) in control of encoding. These are a signal CC given by EOI.$\overline{\text{ATN}_I}$ and a signal DD which is true in the presence of any of AA, BB and CC but false in the absence of all these signals. DD is used to determine when it is necessary to send coded ATN, i.e., ESC, followed by another coded command.

Reverting to the decoding of commands, FIG. 12 shows the circuit which decodes SSRQ, [TCT], $\overline{\text{EOI}}$, SIFC, $\overline{\text{SREN}}$, $\overline{\text{PPS}}$ and PPS. SSRQ is provided by a bistable 100 which is set and reset by the decode on columns 101 and 102 of C6/7 on line 95 with the appropriate bits on C1 to B1 for SRQ and $\overline{\text{SRQ}}$ in accordance with Table VI. SSRQ is also reset by $\overline{\text{8W}}$. [TCT] is a straight decode of C6/7 (secondary commands), $\overline{\text{C1}}$ (selects column 6) and the bits which select row 9. $\overline{\text{EOI}}$ is provided for feeding on to the data bus via line 106 in FIG. 3C by a bistable 103 which is controlled by the decode on column 104 of C6/7 with the bits on C1 to B1 for EOI. The bistable 103 is set at $\phi_2$ by the decode of coded EOI and reset on the next $\phi_2$ by the absence of coded EOI. The bistable is also reset by $\overline{\text{8W}}$. $\overline{\text{EOI}}$ on the corresponding $\overline{\text{D BUS}}$ (FIG. 4) is used to put the EOI internal bus line to "1". $\overline{\text{EOI}}$ is furthermore clamped by $\overline{\text{PPS}}$. SIFC is decoded by columns 107 and 108 from C6/7 and the bits on C1 to B1 for IFC but is locked out when port A is 2-wire. $\overline{\text{SREN}}$ is decoded by column 110 from C6/7 and the bits C1 to B1 for $\overline{\text{REN}}$. PPS is provided by a bistable 109 which is set on $\phi_2$ by the decode of C6/7 with the bits C1 to B1 for PPS (parallel poll serial) and reset on $\phi_1$ or by $\overline{\text{8W}}$.

Figure 13:
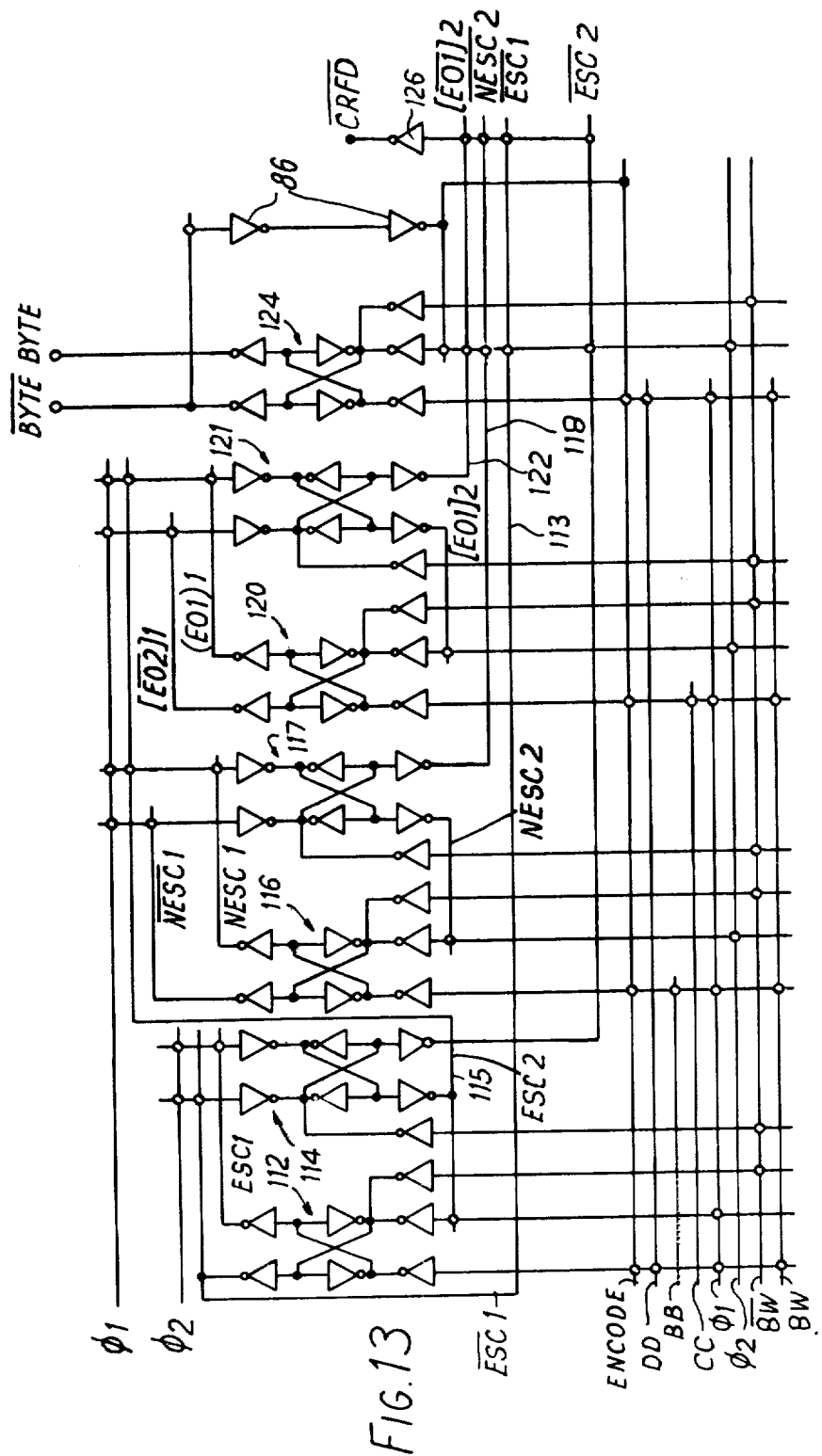

FIG. 13 shows the main parts of block 44 (FIG. 3C) concerned in encoding command signals. Whenever the signal DD (FIG. 11) appears, it indicates that ESC is to be encoded followed by, in decreasing order of priority, possibly [ESC] or [EOI] and BYTE where square brackets denote coded secondary commands (from column 7, Table V) and BYTE indicates a coded command sent from the controller. In order to avoid confusion caused by further inversions, [ESC] will now be referred to as NESC. ESC, NESC and [EOI] are each provided with a pair of bistables of which the first is set as required, while BYTE is provided by a single bistable which is set as required. In the case of ESC, the first bistable 112 is set on $\phi_1$ by the presence of DD with ENCODE and 8W to provide ESC1 and $\overline{\text{ESC1}}$ (where 1 and 2 are added to denote first and second bistables). $\overline{\text{ESC1}}$ false on line 113 is used to control the transmission of ESC as explained below with reference to FIG. 14. The contents of the first bistable 112 are clocked on to the corresponding second bistable 114 at $\phi_2$ to determine ESC2 and $\overline{\text{ESC2}}$. At the next $\phi_1$, if a bistable 116 for NESC or a bistable 120 for [EOI] has been set, the corresponding second bistable 117 or 121 respectively is set. Whichever second bistable is set controls the coding of the ensuing command. The bistables act as a two-phase gated shift register whose priority order is ESC, NESC or [EOI], BYTE. Thus, when ESC is clocked on from first bistable 112 to second bistable 114, the other second bistables 117 and 121 are enabled by ESC2 via line 115. If NESC=[ESC] is to be the ensuing command, the first bistable 16 will have been set by the decode of BB (SATN and $\overline{\text{ATN}_I}$) with ENCODE and 8W and, when the second bistable 117 is set in consequence, $\overline{\text{NESC 2}}$ false on a line 118 is used to control the transmission of coded $\overline{\text{ESC}}$ secondary. [ESC]=NESC removes ATN if set.

If [EOI] is to be the ensuing command, the first bistable 120 will have been set by the decode of CC (EOI with $\overline{\text{ATN}_I}$) with ENCODE and 8W and, when the second bistable 121 is set in consequence, $\overline{\text{[EOI]}}$ 2 on a line 122 is used to control the transmission of coded EOI secondary. Finally, the BYTE bistable 124 which is set with the ESC bistable 112 provides BYTE until $\phi_2$ of the third $\phi_1$, $\phi_2$ cycle (or the second cycle if neither bistable 116 nor bistable 120 had been set) because the bistable 124 is not reset until $\phi_2$ occurs with $\overline{\text{ESC 1}}$, $\overline{\text{ESC 2}}$, $\overline{\text{[EOI]}}$ 2 and $\overline{\text{NESC 2}}$ all restored to the true value.

$\overline{\text{CRFD}}$ is decoded by an inverter 126 and is a signal used by the handshake circuit 32 to control the generation of DAV in the handshake cycle, i.e., for a single DAV at the input port, either two or three DAV's appear at the output port for ESC, [ESC] or [EOI] and BYTE. Only when BYTE has been handshaken can the input port release DAV.

Figure 14:
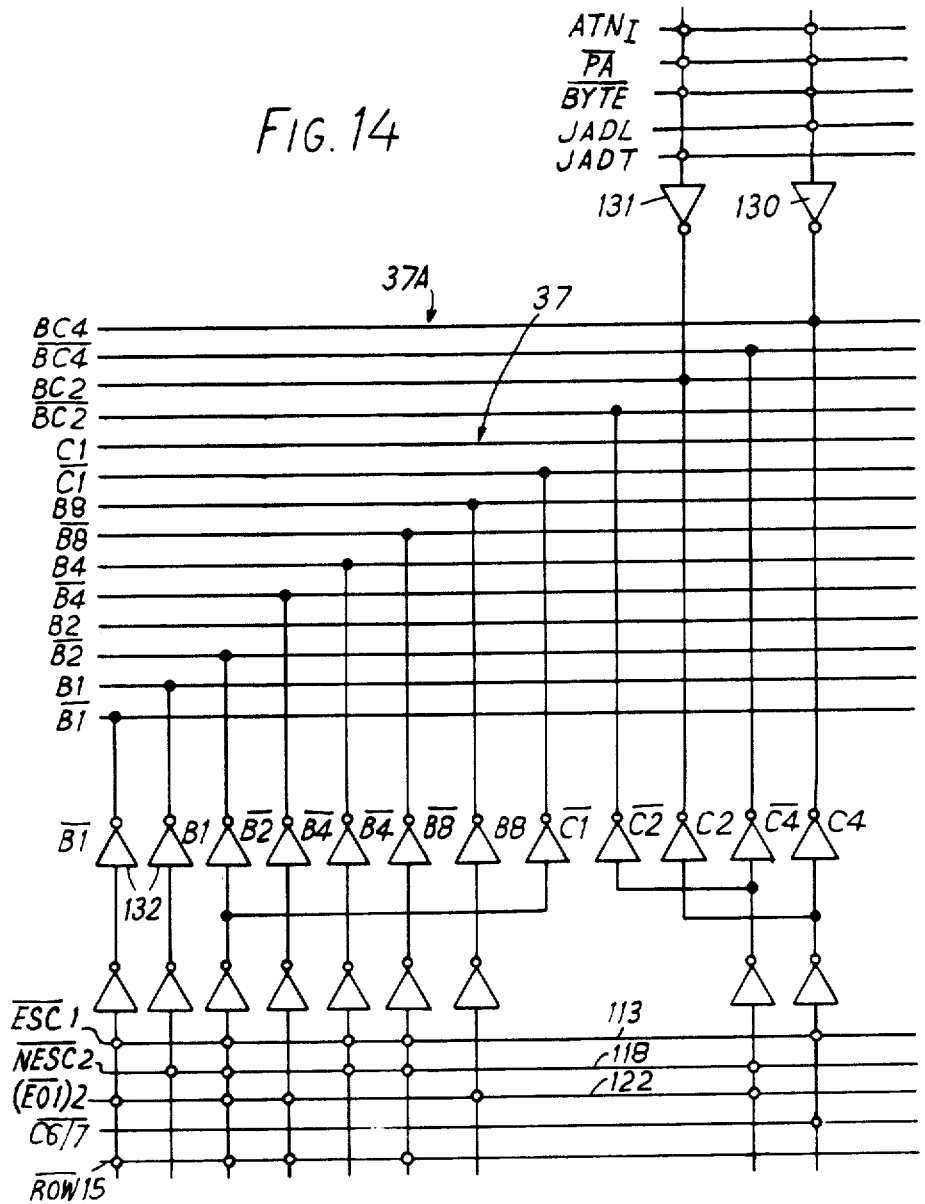

FIG. 14 shows the circuits which impose the necessary coding on the internal bus 37 which is shown here by the bit lines $\overline{\text{C4}}$ down to $\overline{\text{B1}}$ with the inverted bit lines C4 down to B1. It will be recalled from FIG. 4 that each pair of lines has a D BUS terminal for the non-inverted bit and a $\overline{\text{D BUS}}$ terminal for the inverted bit and that the bit can be forced true by pulling the inverted terminal false and can be forced false by pulling the non-inverted bit false. Taking the simplest cases first, the status signal JADL is required to convert a secondary listen address to a primary listen address and an inverter 130 performs this function by forcing C4 from 1 to 0 in the presence of JADL, $\overline{\text{BYTE}}$, $\overline{\text{PA}}$ and ATN$_I$, thereby converting a column 6 or 7 secondary command to a column 2 or 3 listen address. $\overline{\text{PA}}$ is the inversion of PA (FIG. 6) and means not permanently addressed. Similarly, JADT is required to convert a secondary talk address to a primary talk address and an inverter 131 performs this function by forcing C2 from 1 to 0 in the presence of JADT, $\overline{\text{BYTE}}$, $\overline{\text{PA}}$ and ATN$_I$, thereby converting a column 6 or 7 secondary command to a column 4 or 5 talk address.

Figure 4A:
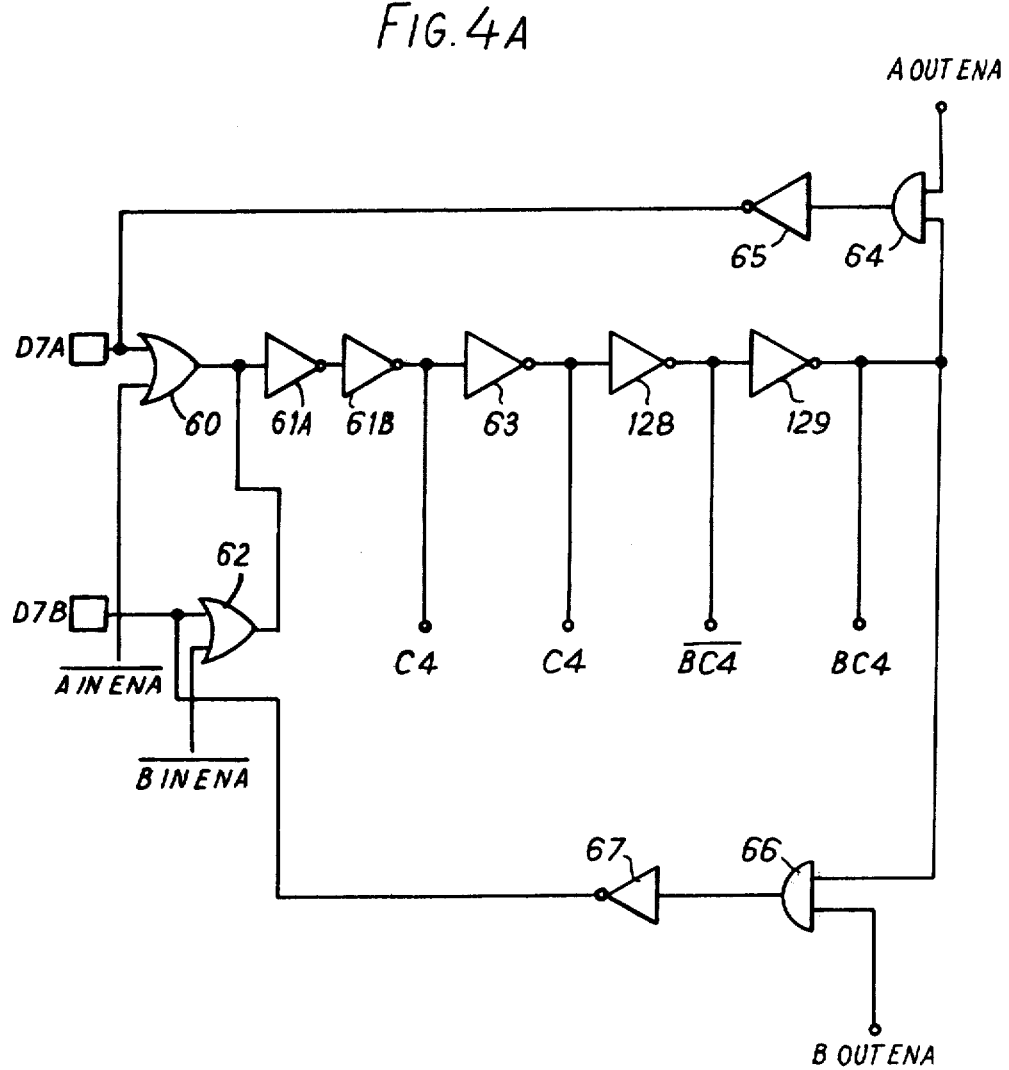
FIG. 4A shows a modification of FIG. 4 utilised in the case of certain bits.

In the case of C4, $\overline{\text{C4}}$, C2 and $\overline{\text{C2}}$, it is necessary to allow the modified command to be transmitted without the interface itself responding to the modified command. For this reason, the lines in FIG. 4 for the bits C4 and C2 are not the lines of the internal bus 37 itself but belong to a buffered bus 37A which can only influence the output at port A or port B, the buffered lines being denoted BC4, $\overline{\text{BC4}}$, BC2 and $\overline{\text{BC2}}$. The way in which these lines are used is illustrated in FIG. 4A for BC4 and $\overline{\text{BC4}}$; the circuit is the same for BC2 and $\overline{\text{BC2}}$. The general legends DXA, DXB,$\overline{\text{D BUS}}$, D BUS used in FIG. 4 have been replaced by the specific symbols applying to C4 (see Table III) namely, D7A, D7B, $\overline{\text{C4}}$ and C4.

$\overline{\text{C4}}$ and C4 are, as in FIG. 4, generated from the input bit by the inverters 61A, 61B and 63 and are used in the internal bus 37 feeding the decoding circuits of FIGS. 9, 10 and 12 and also the ROM 50 controlling the status bistables. $\overline{\text{C4}}$ is again inverted by inverter 128 to form EC4 and yet again inverted by inverter 129 to form $\overline{\text{BC4}}$. It is BC4, rather than C4 which is fed to the output via gate 64 or 66 and the lines BC4 and $\overline{\text{BC4}}$ of FIG. 14 are thus used to force a change in the output but without changing C4 and $\overline{\text{C4}}$.

The other coding functions are performed by a further ROM device (FIG. 14) whose row inputs are $\overline{\text{ESC}}$ 1, $\overline{\text{NESC 2}}$, $\overline{\text{[EOI]}}$ 2, $\overline{\text{C 6/7}}$ and ROW 15. The last signal will be explained below. Due to the inverted form of these inputs, all row inputs are normally true and so, therefore, are the outputs of inverters 132 connected to the majority of the lines of the internal bus 37. True outputs from the inverters 132 cannot influence the bit values which will be determined by DXA or DXB (FIG. 4) depending upon the port enabled by its IN ENA signal. Consider, however, the situation in which $\overline{ESC}$ 1 on line 113 goes false to signal the need to send ESC. From FIG. 14, the outputs of the inverters 132 corresponding to $\overline{C4}$, $\overline{C2}$, C1, B8, $\overline{B4}$, B2 and B1 will all go false and the byte on the internal bus 37, 37A will be forced therefore to 0011011 which is the command ESC (Table VI). Similarly, when $\overline{[ESC]}$ 2 = $\overline{NESC}$ 2 goes false, the code 1111010 for $\overline{ESC}$ secondary is forced on to the bus and when $\overline{[EOI]}$ 2 goes false, the code 1110111 for EOI secondary is forced on to the bus.

When $\overline{C\ 6/7}$ (from FIG. 10) goes false, i.e., when C 6/7 is true, a secondary command has to be converted to a primary command. This means that C4 and C2 have both to be forced from 1 to 0 and this function can be seen to be performed by the circuit of FIG. 14.

Finally $\overline{ROW\ 14}$ is used, when it goes false, to force a talk address to UNT (Table V) by putting B8=B4=B2=B1=1. This is used to cause an interface to send on untalk UNT to any device beyond in response to any talk address other than its own. The circuit for deriving $\overline{ROW\ 15}$ is not shown but essentially involves decoding the function C4.$\overline{C2}$. $\overline{MYAD}$ in which C4.C2 denotes a talk address and $\overline{MYAD}$ indicates that it is not the interface's own address.

To complete the detailed description of the interface, it is necessary to explain the way in which the data flow control circuit 46 (FIG. 3D) controls the flow of data in and out and also how the provision of ATN with an output byte is determined. The circuits which are involved will not be illustrated as they merely involve the decoding of certain signal combinations using ROM circuits of the type illustrated in FIG. 6, and their nature will, therefore, be clear from description of the logic involved. Generally speaking, either port is open to receive data but port B is disabled for data by the local signal LA and disabled for data plus ATN by LA plus the lockout signal L0, and conversely for port B. Also, input at port B will be disabled by the presence of serial poll at A and vice versa.

Greater interest attaches to the output gating which is controlled first and foremost by the aforementioned signal ENA OT, enable onward transmission ENA OT is buffered by a bistable, set conditionally on ENA OT at $\phi_1$ and reset at $\phi_2$ to provide a signal GENOT which has to be true to allow anything out of either port other than a serial poll response, which is enabled at port A by ATN$_A$ and EOI and at port B by ATN$_B$ and EOI.

ENA OT can be pulled from true to false by any one of the following combinations provided by respective inverters with a wired-OR output:

(1) $\overline{TALK}$ . LB. [$\overline{IEC_B.\ PA}$] . DAV$_{AC}$ (2) $\overline{TALK}$ . LA. [$\overline{IEC_B.\ PA}$] . DAV$_{BC}$ The significance of conditions (1) and (2) is that, unless port B is and IEC port (patch 5 or 6) and the interface is permanently addressed, or unless the interface is talk addressed, the interface will not pass on anything from the port opposite a port which is local.

(3) DEV P. TERA. $\overline{C4}$. $\overline{C2}$. $\overline{C1}$ . LIST. ATN$_I$. PPC.

Do not pass on PPC and ATN in the terminal listen state if the interface is device patched.

(4) ATN$_B$ . DEV P . ATN$_I$.

If ATN$_I$ is true, the ATN terminal at the B port, which is the "mode" terminal at a device port, should be driven true which will drive ATN$_B$ false (remembering the logical inversion as between internal signals and external signals, which is illustrated by FIG. 4 — there is no net inversion between DXA or DXB and $\overline{D\ BUS}$). If, therefore, we simultaneously have ATN$_B$ and ATN$_I$ true, with port B a device port (DEV P), the situation is that the device is pulling ATN (mode) false and hence driving ATN$_B$ true. The device pulls ATN low to signify that it does not wish to receive bytes with ATN, this being achieved by condition (4).

(5) $\overline{(DEV\ P.\ PA)}$ . $\overline{(IEC_B\ .\ PA)}$ . $\overline{ATN_I}$ . $\overline{LIST.\ TALK}$ This is the most significant condition which normally pulls ENA OT false when ATN$_I$ is false, unless the interface has been addressed, with LIST or TALK true accordingly. However, there is a let-out from this constraint if the interface is permanently addressed. Thus, bytes without ATN can only be passed on if the interface is addressed (permanently or by means of commands sent thereto).

(6) $\overline{ESC}$+([SRQ]+$\overline{[SRQ]}$+[EOI]+[IFC]+$\overline{[REN]}$+[PP])

The plus sign is used to denote the logical "or". When an interface is 8W (patch 2A or 6A) at the side from which DAV was received, it will not pass on ESC or the coded forms of SRQ, $\overline{SRQ}$, EOI, IFC, REN and PP.

(7) LA.LO+LB.LO+LB.$\overline{8WA.TALK}$. $\overline{ATN_I.LA}$. $\overline{8WB}$ . $\overline{TALK}$. $\overline{ATN_I}$. $\overline{PA}$ Nothing can be passed on when lockout is present and either port is local. When a port is local, no data (ATN absent) will be passed on unless the other port is 8W or TALK is present or (in the case of LA), PA is present.

In addition to the main conditions explained above, once detailed consideration of operation is entered into, it is found necessary to impose special conditions upon selected columns of the ACSII table, such that ENA OT may be removed even although the interface is addressed. These special conditions can be summarized as follows:

(8) Unless LIST or PA or TCT, do not pass on column 0 plus ATN.

(9) Unless LIST or PA.DEV P, do not in the terminally addressed state, pass on column 1 plus ATN to a device.

(10) Unless IEC$_B$ and PA, do not pass on column 2 plus ATN.

(11) Unless (IEC$_B$ and PA) or (IEC$_B$ and UNLISTEN) is received from a side which is intermediately addressed, do not pass on column 3 plus ATN.

(12) If MYAD is set, do not pass on column 4 or 5 with ATN.

(13) Unless IEC$_B$ and PA or data is available from a side which is intermediately addressed, do not pass on column 4 or 5 with ATN. Note that, even if column 4 or 5 are onward transmitted, they are converted to UNTALK in the process.

(14) Unless (IEC$_B$ and PA) or (JCOM and $\overline{DEV.P\ PA}$)) and data is available (DAV) from a side which is intermediately addressed, do not pass on column 6 or 7 with ATN.

A OUT ENA is enabled by GENOT with DAV$_B$ and also by ATN$_A$ with EOI while B OUT ENA is enabled by GENOT with $DAV_A$ and also by $ATN_B$ with EOI and $IEC_B$. These conditions apply to the data terminals D1 to D8 and are slightly different for EOI. A OUT ENA for EOI is enabled by GENOT, $DAV_B$ or by $EOI.ATN_B$. $_{IECB}$ but is clamped by LB. $(\overline{TALK}.\overline{AT}$-$\overline{N_I}.INTA)$. B OUT ENA for EOI is enabled by GENOT. $\overline{ATN_I}.DAV_A$ or again by $EOI.ATN_A$.

ATN can be gated out at port A by the combination $\overline{ATOB}$. $\overline{LB}$. $IEC_B$. $IEC_A$. $PPS_B$ or $\overline{ATOB}$. $\overline{LB}$. $IEC_B$. $IEC_A$. $ATN_B$ and can be gated out at port B by $\overline{ATN_I}$. DEV P. PA or $\overline{ATN_I}$. DEV P. TERA (TALK +LIST) or ATOB $(\overline{LA}. \overline{PA}).IHC_B.PPS_A$ or ATOB $(\overline{LA}.\overline{PA}).IEC_B.ATN_A$ or ATOB. $IEC_B$. $ATN_A$. PA. $PPS_A$ and $PPS_B$ mean PPS receive from side A and side B respectively.

To complete the explanation of the described embodiment of the invention, the manner in which it fulfills each aspect of the invention as hereinbefore defined, will now be mentioned.

The invention in its first aspect relates essentially to an interface patched in mode 6A and used as shown in FIG. 2B. The encoding circuit of FIGS. 13 and 14 only encodes ATN, EOI, etc., in the presence of ENOT and the encoded data bytes are only allowed to pass to port A via the output drivers 47A (FIG. 1 and FIG. 4) by A OUT ENA when GENOT is true. However, GENOT is sent false unless the interface is addressed, (see the condition (5) relating to ENA OT) in the case of any byte without ATN; addressed command bytes and data can only be passed on if the interface has been addressed.

The invention in its second aspect relates essentially to an interface patched in mode 5 and used as shown in FIG. 2D. When the interface has been addressed on port A (TERA) as a terminal listener (LIST), the circuits of FIGS. 8 and 8A provide the signal ENCODE which enables commands on port B to be encoded by the circuits of FIGS. 13 and 14 and sent on in encoded form from the addressed port A. In other words, the interface when addressed as a listener on port A starts to behave as if it were 8W on port A and this condition remains until the addressed state is removed by UNLISTEN. The same situation can be established at port B and it is possible to make the interface behave as if it were 8W on both ports. The invention can thus also be applied to a patch 6A situation in which port A is physically an 8W port. If the interface is addressed as a listener on the IEC port B, it behaves as if it were 8W on this port also.

We claim:

1. An interface comprising a first port including a plurality of data terminals and a plurality of command terminals dedicated to predetermined command functions, a second port including at least one data terminal, an encoding circuit coupled to at least some of said command terminals and operative in response to commands received thereon to provide corresponding data bytes encoding the commands, a circuit coupled to said first and second ports and said encoding circuit for selectively enabling data received at the data terminals of the first port and the data bytes representing encoded commands to be passed to the at least one data terminal of the second port, status circuits which are coupled to at least one of said ports and which establish statuses of the interface in accordance with commands fed thereto, including a status indicating that the interface itself has been addressed, and a circuit coupled to the selectively enabling circuit and the status circuits and responsive to the absence of this status to disable the selectively enabling circuit, thereby to prevent data received at the data terminals of the first port and at least some of the data bytes representing encoded commands from being passed to the at least one data terminal of the second port unless the interface itself has been addressed.

2. An interface according to claim 1, comprising means for patching the interface with any selected one of a plurality of addresses including an address representing a permanently addressed state, wherein said disable circuit includes means coupled to said patching means and responsive to the permanently addressed state to enable the selectively enabling circuit, thereby to permit data to be passed to the second port.

3. An interface according to claim 1, wherein the encoding circuit is arranged to send in priority order the data byte ESC, one of the data byte codes for coded ESC and coded EOI, and a data byte accompanying the command signal at the first port.

4. An interface according to claim 3, comprising first, second and third pairs of bistable circuits corresponding to ESC, coded ECS and coded EOI respectively, and an additional bistable circuit, logical circuits coupled to the first port and said bistable circuits and responsive to said at least some commands to set the first bistable circuit of the first pair and the said additional bistable circuit, and conditionally to set the first bistable circuit of a selected one of the second and third pairs of bistable circuits in dependence upon the commands, a handshake circuit coupled to the first port and the additional bistable circuit and operative to provide handshake cycles so long as the additional bistable circuit is set, means coupled to the handshake circuit and the first pair of bistable circuits and operative in a first handshake cycle to set the second bistable circuit of the first pair and to cause ESC to be encoded by the encoding circuit in response to the set state of the first bistable circuit of the first pair, means coupled to the handshake circuit, the second bistable circuit of the first pair and the bistable circuits of the second and third pairs and enabled by the set second bistable circuit of the first pair and operative in a second handshake cycle to cause the second bistable circuit of the selected one of the second and third pairs to be set if the first stable circuit of the pair had been set, and to cause one of coded ESC and coded EOI correspondingly to be encoded, feedback connections between the second and first bistable circuits of each pair such that the setting of a second bistable circuit of a pair leads to resetting of the first bistable circuit and hence subsequently to resetting of the second bistable circuit, and means coupled to the bistable circuits of the first pair and the second bistable circuits of the second and third pair and arranged to reset the additional bistable circuit after one of the second and third handshake cycles in consequence upon the resetting of all bistable circuits of the first, second and third pairs.

5. An interface comprising a first port including a plurality of data terminals and a plurality of command terminals dedicated to predetermined command functions, a second port including at least one data terminal, an encoding circuit which is coupled to at least some of said command terminals and to said second port and which is selectively operable in response to commands signalled on said at least some command terminals to feed corresponding data bytes encoding the commands to the at least one data terminal of the second port, status circuits which are coupled to said ports and which establish statuses of the interface in accordance with commands fed thereto through either port, including a status indicating that the interface itself has been addressed in a predetermined manner, and a circuit coupled to the selectively operable encoding circuit and the status circuits and responsive to this status to enable operation of the selectively operable encoding circuit.

6. An interface according to claim 5, wherein the circuit which enables the selectively operable encoding circuit provides an enabling signal when either port is addressed as a listener and data available is signalled at the other port.

7. An interface comprising a first port including a plurality of data terminals and a plurality of command terminals dedicated to predetermined command functions, a second port including at least one data terminal, a decoding circuit coupled to said second port for decoding at least some encoded commands received on the at least one data terminal of the second port for application to corresponding command terminals of the first port, a circuit coupled to said first and second ports and said decoding circuit for selectively enabling data signalled on the at least one data terminal of the second port to be passed to the data terminals of the first port and at least some encoded commands to be passed to the command terminals of the first port, status circuits which are coupled to at least one of said ports and which establish statuses of the interface in accordance with commands fed thereto, including a status indicating that the interface itself has been addressed, and a circuit coupled to the selectively enabling circuit and the status circuits and responsive to the absence of this status to disable the selectively enabling circuit, thereby to prevent data bytes received at the at least one data terminal of the second port from being passed to the data terminals of the first port and to prevent at least some of the encoded commands received at the at least one data terminal of the second port from being passed to the command terminals of the first port.

8. An interface comprising a first port including a plurality of data terminals and a plurality of command terminals dedicated to predetermined command functions, a second port including at least one data terminal, a decoding circuit which is coupled to at least some of said command terminals and to said second port and which is selectively operable in response to at least some encoded commands received on the at least one data terminal of the second port to feed corresponding signals to the at least some command terminals of the first port, status circuits which are coupled to said ports and which establish statuses of the interface in accordance with commands fed thereto through either port, including a status indicating that the interface itself has been addressed in a predetermined manner, and a circuit coupled to the selectively operable decoding circuit and the status circuits and responsive to this status to enable operation of the selectively operable decoding circuit.

* * * * *